(12) United States Patent
Jiang et al.

(10) Patent No.: US 10,419,341 B2
(45) Date of Patent: Sep. 17, 2019

(54) FORWARDING ENTRY ESTABLISHMENT METHOD AND APPARATUS

(71) Applicant: HUAWEI TECHNOLOGIES CO., LTD., Guangdong (CN)

(72) Inventors: Weilian Jiang, Nanjing (CN); Yinjuan Zhang, Nanjing (CN); Yuan Gao, Nanjing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/933,274

(22) Filed: Mar. 22, 2018

(65) Prior Publication Data

US 2018/0219775 A1 Aug. 2, 2018

Related U.S. Application Data

(63) Continuation of application No. PCT/CN2016/111942, filed on Dec. 24, 2016.

(30) Foreign Application Priority Data

Apr. 29, 2016 (CN) .......................... 2016 1 0285803

(51) Int. Cl.
*H04L 12/56* (2006.01)
*H04L 12/741* (2013.01)
(Continued)

(52) U.S. Cl.
CPC ............ *H04L 45/74* (2013.01); *H04L 45/586* (2013.01); *H04L 49/354* (2013.01); *H04L 49/70* (2013.01);
(Continued)

(58) Field of Classification Search
CPC .............. H04L 12/5601; H04L 12/741; H04L 29/06095; H04L 29/0653; H04L 45/02;
(Continued)

(56) References Cited

U.S. PATENT DOCUMENTS 9,374,323 B2 * 6/2016 Zhang ................... H04L 49/354
9,565,105 B2 * 2/2017 Kapadia ................ H04L 45/745
(Continued)

FOREIGN PATENT DOCUMENTS

CN 103546374 A 1/2014
CN 103814554 A 5/2014
(Continued)

OTHER PUBLICATIONS

Mahalingann et al, Virtual eXtensible Local Area Network (VXLAN): A Framework for Overlaying Virtualized Layer 2 Networks over Layer 3 Networks, RFC 7348, 22 pages, Aug. 2014.*

*Primary Examiner* — Frank Duong
(74) *Attorney, Agent, or Firm* — Womble Bond Dickinson (US) LLP

(57) ABSTRACT

Embodiments of the disclosure relate to a forwarding entry establishment method for a VXLAN. A data center of the VXLAN includes a first layer 3 gateway device, a second layer 3 gateway device, and a first layer 2 gateway device separately connected to the first layer 3 gateway device and the second layer 3 gateway device. The first layer 2 gateway device is connected to a first host. The method includes: establishing, by the first layer 3 gateway device by using an exclusive IP address, an exclusive MAC address, and an exclusive VTEP identifier, a forwarding entry used for communication with the first host. In the embodiments of the disclosure, when one host directly communicates with a plurality of layer 3 gateway devices, a forwarding entry used for communication between the layer 3 gateway devices and the host is correctly established.

21 Claims, 9 Drawing Sheets

(51) Int. Cl.
*H04L 12/713* (2013.01)
*H04L 12/931* (2013.01)
*H04L 29/12* (2006.01)

(52) U.S. Cl.
CPC ........ *H04L 61/103* (2013.01); *H04L 61/6022* (2013.01)

(58) Field of Classification Search
CPC ....... H04L 45/04; H04L 45/54; H04L 45/586; H04L 45/74; H04L 49/3009; H04L 49/309; H04L 49/354; H04L 49/70; H04L 61/103; H04L 61/6022
See application file for complete search history.

(56) References Cited

U.S. PATENT DOCUMENTS

| | | |
|---|---|---|
| 2015/0009992 A1 | 1/2015 | Zhang |
| 2015/0016462 A1 | 1/2015 | Zhou |
| 2015/0058470 A1 | 2/2015 | Duda et al. |
| 2015/0063353 A1 | 3/2015 | Kapadia et al. |
| 2015/0124586 A1 | 5/2015 | Pani et al. |
| 2016/0226678 A1* | 8/2016 | Sridhar .................. H04L 45/74 |
| 2016/0294769 A1 | 10/2016 | Song et al. |
| 2017/0257306 A1 | 9/2017 | Huang et al. |

FOREIGN PATENT DOCUMENTS

| | | |
|---|---|---|
| CN | 104243269 A | 12/2014 |
| CN | 105515992 A | 4/2016 |

\* cited by examiner

200

A first layer 3 gateway device obtains a fourth MAC address of a first host and a fourth VTEP identifier of a first layer 2 gateway device by using a second IP address, a second MAC address, a second VTEP identifier, and a fourth IP address  ⟋ 210

Establish a first forwarding entry based on the second IP address, the second MAC address, the second VTEP identifier, the fourth IP address, the fourth MAC address, and the fourth VTEP identifier, where in the first forwarding entry, a source IP address is the second IP address, a source MAC address is the second MAC address, a destination IP address is the fourth IP address, and a destination MAC address is the fourth MAC address, and the first forwarding entry is used to indicate that the fourth MAC address is corresponding to the fourth VTEP identifier  ⟋ 220

FIG. 2

FORWARDING ENTRY ESTABLISHMENT METHOD AND APPARATUS

CROSS-REFERENCE TO RELATED APPLICATIONS

This application is a continuation of International Application No. PCT/CN2016/111942, filed on Dec. 24, 2016, which claims priority to Chinese Patent Application No. 201610285803.5, filed on Apr. 29, 2016. The disclosures of the aforementioned applications are hereby incorporated by reference in their entireties.

TECHNICAL FIELD

Embodiments of the disclosure relate to the communications field, and more specifically, to a forwarding entry establishment method for a Virtual Extensible Local Area Network (VXLAN).

BACKGROUND

A data center of a VXLAN may include a layer 3 gateway device and a layer 2 gateway device. Different layer 3 gateway devices are connected to different layer 2 gateway devices. Different layer 2 gateway devices are connected to different hosts. In this case, one host can directly communicate only with one layer 3 gateway device by using a layer 2 gateway device connected to the host. As a result, a communication manner of the data center is not flexible enough. Herein, that the host directly communicates with the layer 3 gateway device means that communication is performed without using another layer 3 gateway device.

How to enable one host to directly communicate with a plurality of layer 3 gateway devices specifically includes: how to establish a forwarding entry used for communication between the layer 3 gateway devices and the host. This is a problem that urgently needs to be resolved.

SUMMARY

Embodiments of the disclosure relate to a forwarding entry establishment method and apparatus for a VXLAN, a data center, and a storage medium, so that a forwarding entry used for communication between a layer 3 gateway device and a host can be established, and one host can directly communicate with a plurality of layer 3 gateway devices.

A first aspect relates to a forwarding entry establishment method for a VXLAN, implemented on a layer 3 gateway device, where a data center of the VXLAN includes at least two layer 3 gateway devices, and a layer 2 gateway device separately connected to the at least two layer 3 gateway devices; the layer 2 gateway device is connected to a host; each layer 3 gateway device shares a virtual address and a virtual identifier with another layer 3 gateway device; the virtual address includes a virtual Internet Protocol IP address and a virtual Media Access Control MAC address; the virtual identifier includes a virtual VXLAN tunnel end point VTEP identifier corresponding to the virtual IP address and the virtual MAC address; each layer 3 gateway device further has an exclusive real address and an exclusive real identifier; the real address includes a real IP address and a real MAC address; the real identifier includes a real VTEP identifier corresponding to the real IP address and the real MAC address; the layer 2 gateway device has a VTEP identifier; the host has an IP address and a MAC address corresponding to the IP address; and the method includes:

obtaining, by the layer 3 gateway device, the MAC address of the host and the VTEP identifier of the layer 2 gateway device by using the real IP address, the real MAC address, and the real VTEP identifier of the layer 3 gateway device, and the IP address of the host; and establishing a forwarding entry based on the real IP address, the real MAC address, and the real VTEP identifier of the layer 3 gateway device, the IP address of the host, the MAC address of the host, and the VTEP identifier of the layer 2 gateway device, where in the forwarding entry, a source IP address is the real IP address of the layer 3 gateway device, a source MAC address is the real MAC address of the layer 3 gateway device, a destination IP address is the IP address of the host, and a destination MAC address is the MAC address of the host, and the forwarding entry further includes information indicating that the MAC address of the host is corresponding to the VTEP identifier of the layer 2 gateway device.

The forwarding entry is established on the layer 3 gateway device by using the exclusive real address (including the real IP address and the real MAC address) and the exclusive real VTEP identifier of the layer 3 gateway device, the IP address and the MAC address of the host, and the VTEP identifier of the layer 2 gateway device, so that the following problem can be avoided: Because a plurality of layer 3 gateway devices have a shared virtual address, a packet that needs to be sent to a specific layer 3 gateway device is sent to another layer 3 gateway device with the shared virtual address. Therefore, one host can directly communicate with each of the plurality of layer 3 gateway devices. In addition, the layer 3 gateway device independently establishes the forwarding entry, without depending on a forwarding entry established by a controller. Therefore, a case in which communication between the host and the plurality of layer 3 gateway devices is affected due to excessive dependence on the controller can be avoided.

With reference to the first aspect, in a first embodiment of the first aspect, the data center of the VXLAN includes a first layer 3 gateway device, a second layer 3 gateway device, and a first layer 2 gateway device separately connected to the first layer 3 gateway device and the second layer 3 gateway device; the first layer 2 gateway device is connected to a first host; the first layer 3 gateway device has a first Internet Protocol IP address, a second IP address, a first Media Access Control MAC address corresponding to the first IP address, a second MAC address corresponding to the second IP address, a first VXLAN tunnel end point VTEP identifier corresponding to the first IP address and the first MAC address, and a second VTEP identifier corresponding to the second IP address and the second MAC address; the second layer 3 gateway device has the first IP address, a third IP address, the first MAC address, a third MAC address corresponding to the third IP address, the first VTEP identifier, and a third VTEP identifier corresponding to the third IP address and the third MAC address; the first layer 2 gateway device has a fourth VTEP identifier; the first host has a fourth IP address and a fourth MAC address corresponding to the fourth IP address; the first IP address, the second IP address, the third IP address, and the fourth IP address are different from each other; the first MAC address, the second MAC address, the third MAC address, and the fourth MAC address are different from each other; the first VTEP identifier, the second VTEP identifier, the third VTEP identifier, and the fourth VTEP identifier are different from each other; and the method includes: obtaining, by the first layer 3 gateway device, the fourth MAC address of the first host and the fourth VTEP identifier of the first layer 2 gateway device by using the second IP address, the second MAC address, the second VTEP identifier, and the fourth IP address, where the second IP address is an IP address exclusive to the first layer 3 gateway device, the second MAC address is a MAC address exclusive to the first layer 3 gateway device, and the second VTEP identifier is a VTEP identifier exclusive to the first layer 3 gateway device; and establishing a first forwarding entry based on the second IP address, the second MAC address, the second VTEP identifier, the fourth IP address, the fourth MAC address, and the fourth VTEP identifier, where in the first forwarding entry, a source IP address is the second IP address, a source MAC address is the second MAC address, a destination IP address is the fourth IP address, and a destination MAC address is the fourth MAC address, and the first forwarding entry is used to indicate that the fourth MAC address is corresponding to the fourth VTEP identifier.

Therefore, in this embodiment of the disclosure, at least two layer 3 gateway devices have a shared IP address, a shared MAC address, and a shared VTEP identifier, and each have an exclusive IP address, an exclusive MAC address, and an exclusive VTEP identifier. The layer 3 gateway device establishes a forwarding entry based on the exclusive second IP address, the exclusive second MAC address, and the exclusive second VTEP identifier. Therefore, normal communication between the host and the first layer 3 gateway can be implemented, and the following problem can be avoided: Because the first layer 3 gateway device and the second layer 3 gateway device have a shared address and identifier, a packet that needs to be sent to the first layer 3 gateway device is sent to the second layer 3 gateway device. Specifically, the layer 3 gateway device broadcasts an address request packet to the host based on the exclusive IP address, the exclusive MAC address, and the exclusive VTEP identifier. If an address response packet that is fed back by the host and that passes a layer 2 gateway device carries the exclusive IP address, the exclusive MAC address, and the exclusive VTEP identifier of the layer 3 gateway device, the address response packet is not sent to another layer 3 gateway device. Therefore, the forwarding entry can be correctly established, and traffic can be sent from the gateway device to the host device in time. In addition, the first layer 3 gateway device independently establishes the forwarding entry, without depending on a controller to establish a forwarding entry. Therefore, it can be further ensured that normal communication between the first layer 3 gateway device and the host does not excessively depend on a forwarding entry of a controller.

Herein, the first layer 3 gateway device is equivalent to the second layer 3 gateway device, and the second layer 3 gateway device can also perform the foregoing operations.

With reference to the first embodiment of the first aspect, in a second embodiment of the first aspect, that the first layer 3 gateway device determines, by using the second IP address, the second MAC address, the second VTEP identifier, and the fourth IP address, that a MAC address corresponding to the fourth IP address is the fourth MAC address and a VTEP identifier corresponding to the fourth IP address is the fourth VTEP identifier includes: sending, by the first layer 3 gateway device, a first address request packet, where in the first address request packet, a source IP address is the second IP address, a source MAC address is the second MAC address, a source VTEP identifier is the second VTEP identifier, and a destination IP address is the fourth IP address; receiving, by the first layer 3 gateway device, a first address response packet that is from the first host and that passes the first layer 2 gateway device, where in the first address response packet, a destination IP address is the second IP address, a destination MAC address is the second MAC address, a destination VTEP identifier is the second VTEP identifier, a source IP address is the fourth IP address, a source MAC address is the fourth MAC address, and a source VTEP identifier is the fourth VTEP identifier; and obtaining the fourth MAC address of the first host and the fourth VTEP identifier of the first layer 2 gateway device based on the first address response packet.

Optionally, the address request packet mentioned in this embodiment of the disclosure may be referred to as an ARP request packet, and the address response packet may be referred to as an ARP response packet.

Optionally, the first forwarding entry may be divided into two forwarding sub-entries. One forwarding sub-entry may be referred to as an ARP entry. In the ARP entry, a source IP address is the second IP address, a source MAC address is the second MAC address, a destination IP address is the fourth IP address, and a destination MAC address is the fourth MAC address. The other forwarding sub-entry may be referred to as a MAC forwarding entry that is used to: indicate that a VTEP identifier corresponding to the fourth MAC address is the fourth VTEP identifier, and perform VXLAN encapsulation.

With reference to the second embodiment of the first aspect, in a third embodiment of the first aspect, the data center includes a plurality of layer 2 gateway devices, each of the plurality of layer 2 gateway devices is connected to the first layer 3 gateway device, and the plurality of layer 2 gateway devices include the first layer 2 gateway device; and the sending, by the first layer 3 gateway device, a first address request packet includes: sending, by the first layer 3 gateway device, a plurality of first address request packets, where the plurality of first address request packets are in a one-to-one correspondence with the plurality of layer 2 gateway devices, and each first address request packet carries a VTEP identifier of a corresponding layer 2 gateway device; or sending, by the first layer 3 gateway device, the first address request packet, where a VTEP identifier in the first address request packet is a first multicast VTEP identifier.

With reference to the second or the third embodiment of the first aspect, in a fourth embodiment of the first aspect, a server to which the first host belongs is a silent server, that is, a server that does not actively send a packet.

With reference to any one of the first to the fourth embodiments of the first aspect, in a fifth embodiment of the first aspect, the method further includes: by using the first IP address, the first MAC address, and the first VTEP identifier, assisting, by the first layer 3 gateway device, the first host in establishing a second forwarding entry, and assisting the first layer 2 gateway device in establishing a third forwarding entry, where in the second forwarding entry, a source IP address is the fourth IP address, a source MAC address is the fourth MAC address, a destination IP address is the first IP address, and a destination MAC address is the first MAC address, and the third forwarding entry is used to indicate that the first MAC address is corresponding to the first VTEP identifier.

In this embodiment of the disclosure, a plurality of layer 3 gateway devices have a shared IP address, a shared MAC address, and a shared VTEP identifier. Each gateway device has an exclusive IP address, an exclusive MAC address, and an exclusive VTEP identifier. A host and a layer 2 gateway device establish a forwarding entry based on the shared IP address, the shared MAC address, and the shared VTEP identifier, so that traffic forwarding as well as an active-active function can be implemented.

With reference to the fifth embodiment of the first aspect, in a sixth embodiment of the first aspect, the assisting the first host in establishing a second forwarding entry, and assisting the first layer 2 gateway device in establishing a third forwarding entry includes: receiving, by the first layer 3 gateway device, a second address request packet that is from the first host and that passes the first layer 2 gateway device, where in the second address request packet, a source IP address is the fourth IP address, a source MAC address is the fourth MAC address, a source VTEP identifier is the fourth VTEP identifier, a destination IP address is the first IP address, and a destination VTEP identifier is the first VTEP identifier or a second multicast VTEP identifier; determining that the destination IP address in the second address request packet is the first IP address; determining the first MAC address corresponding to the first IP address, and the first VTEP identifier corresponding to the first IP address; generating a second address response packet based on the first IP address, the first MAC address, the first VTEP identifier, the fourth IP address, the fourth MAC address, and the fourth VTEP identifier, where in the second address response packet, a source VTEP identifier is the first VTEP identifier, a source IP address is the first IP address, a source MAC address is the first MAC address, a destination IP address is the fourth IP address, a destination MAC address is the fourth MAC address, and a destination VTEP identifier is the fourth VTEP identifier;

and sending, by the first layer 3 gateway device, the second address response packet, so that the first layer 2 gateway device establishes the third forwarding entry according to the received second address response packet, and the first host establishes the second forwarding entry according to the received second address response packet that is obtained after VXLAN decapsulation and that is sent by the first layer 2 gateway device.

With reference to the sixth embodiment of the first aspect, in a seventh embodiment of the first aspect, the method further includes: receiving, by the first layer 3 gateway device, a third address request packet that is from the first host and that passes the first layer 2 gateway device, where in the third address request packet, a source IP address is the fourth IP address, a source MAC address is the fourth MAC address, a source VTEP identifier is the fourth VTEP identifier, a destination IP address is the first IP address, and a destination VTEP identifier is the second VTEP identifier; determining that, in the third address request packet, the destination IP address is the first IP address, and the destination VTEP identifier is the second VTEP identifier; determining the first VTEP identifier corresponding to the first IP address; and discarding the third address request packet.

With reference to the fifth embodiment of the first aspect, in an eighth embodiment of the first aspect, the assisting the first host in establishing a second forwarding entry, and assisting the first layer 2 gateway device in establishing a third forwarding entry includes: sending, by the first layer 3 gateway device, a notification packet, where in the notification packet, a source IP address is the first IP address, a source MAC address is the first MAC address, and a source VTEP identifier is the first VTEP identifier, so that the first layer 2 gateway device establishes the third forwarding entry after receiving the notification packet, the first layer 2 gateway device performs VXLAN decapsulation on the notification packet, and sends, to the first host, the notification packet that is obtained after VXLAN decapsulation, and the first host establishes the second forwarding entry.

With reference to the eighth embodiment of the first aspect, in a ninth embodiment of the first aspect, before the sending, by the first layer 3 gateway device, a notification packet, the method further includes: determining that the first MAC address and/or the first IP address change/changes.

In this embodiment of the disclosure, a plurality of layer 3 gateway devices have a shared IP address (a virtual IP address), a shared MAC address (a virtual MAC address), and a shared VTEP identifier (a virtual VTEP identifier). Each gateway device has an exclusive IP address (a real IP address), an exclusive MAC address (a real MAC address), and an exclusive VTEP identifier (a real VTEP identifier). The layer 3 gateway device may assist, by using the shared IP address (the virtual IP address), the shared MAC address (the virtual MAC address), and the shared VTEP identifier (the virtual VTEP identifier), a host and a layer 2 gateway device in establishing a forwarding entry. Therefore, the host and the layer 2 gateway device can send traffic by using the forwarding entry. Because a destination address in the traffic is corresponding to the plurality of layer 3 gateway devices, the traffic can be forwarded to any one of the plurality of layer 3 gateway devices, to implement balancing and an active-active function. In addition, the layer 3 gateway device broadcasts an address request packet to the host based on the exclusive IP address (the real IP address), the exclusive MAC address (the real MAC address), and the exclusive VTEP identifier (the real VTEP identifier) of the layer 3 gateway device. If an ARP response packet that is fed back by the host and that passes the layer 2 gateway device carries the exclusive IP address, the exclusive MAC address, and the exclusive VTEP identifier of the layer 3 gateway device, the address response packet is not sent to another layer 3 gateway device. Therefore, a forwarding entry can be correctly established, and traffic can be sent from the gateway device to the host device.

A second aspect relates to a forwarding entry establishment apparatus for a VXLAN, where a data center of the VXLAN includes a first layer 3 gateway device, a second layer 3 gateway device, and a first layer 2 gateway device separately connected to the first layer 3 gateway device and the second layer 3 gateway device;

the first layer 2 gateway device is connected to a first host; the first layer 3 gateway device has a first Internet Protocol IP address, a second IP address, a first Media Access Control MAC address corresponding to the first IP address, a second MAC address corresponding to the second IP address, a first VXLAN tunnel end point VTEP identifier corresponding to the first IP address and the first MAC address, and a second VTEP identifier corresponding to the second IP address and the second MAC address; the second layer 3 gateway device has the first IP address, a third IP address, the first MAC address, a third MAC address corresponding to the third IP address, the first VTEP identifier, and a third VTEP identifier corresponding to the third IP address and the third MAC address; the first layer 2 gateway device has a fourth VTEP identifier; the first host has a fourth IP address and a fourth MAC address corresponding to the fourth IP address; the first IP address, the second IP address, the third IP address, and the fourth IP address are different from each other; the first MAC address, the second MAC address, the third MAC address, and the fourth MAC address are different from each other; the first VTEP identifier, the second VTEP identifier, the third VTEP identifier, and the fourth VTEP identifier are different from each other; and the forwarding entry establishment apparatus is the first layer 3 gateway device, and the apparatus includes: an obtaining unit, configured to obtain the fourth MAC address of the first host and the fourth VTEP identifier of the first layer 2 gateway device by using the second IP address, the second MAC address, the second VTEP identifier, and the fourth IP address, where the second IP address is an IP address exclusive to the first layer 3 gateway device, the second MAC address is a MAC address exclusive to the first layer 3 gateway device, and the second VTEP identifier is a VTEP identifier exclusive to the first layer 3 gateway device; and an establishment unit, configured to establish a first forwarding entry based on the second IP address, the second MAC address, the second VTEP identifier, the fourth IP address, the fourth MAC address, and the fourth VTEP identifier, where in the first forwarding entry, a source IP address is the second IP address, a source MAC address is the second MAC address, a destination IP address is the fourth IP address, and a destination MAC address is the fourth MAC address, and the first forwarding entry is used to indicate that the fourth MAC address is corresponding to the fourth VTEP identifier.

With reference to the second aspect, in a first embodiment of the second aspect, the apparatus further includes a sending unit and a receiving unit; the sending unit is configured to send a first address request packet, where in the first address request packet, a source IP address is the second IP address, a source MAC address is the second MAC address, a source VTEP identifier is the second VTEP identifier, and a destination IP address is the fourth IP address; the receiving unit is configured to receive a first address response packet that is from the first host and that passes the first layer 2 gateway device, where in the first address response packet, a destination IP address is the second IP address, a destination MAC address is the second MAC address, a destination VTEP identifier is the second VTEP identifier, a source IP address is the fourth IP address, a source MAC address is the fourth MAC address, and a source VTEP identifier is the fourth VTEP identifier; and the obtaining unit is configured to obtain the fourth MAC address of the first host and the fourth VTEP identifier of the first layer 2 gateway device based on the first address response packet.

With reference to the first embodiment of the second aspect, in a second embodiment of the second aspect, the data center includes a plurality of layer 2 gateway devices; each of the plurality of layer 2 gateway devices is connected to the first layer 3 gateway device; the plurality of layer 2 gateway devices include the first layer 2 gateway device; and the sending unit is further configured to: send a plurality of first address request packets, where the plurality of first address request packets are in a one-to-one correspondence with the plurality of layer 2 gateway devices, and each first address request packet carries a VTEP identifier of a corresponding layer 2 gateway device; or send the first address request packet, where a VTEP identifier in the first address request packet is a first multicast VTEP identifier.

With reference to the first or the second embodiment of the second aspect, in a third embodiment of the second aspect, a server to which the first host belongs is a silent server.

With reference to any one of the second aspect or the foregoing embodiments of the second aspect, in a fourth embodiment of the second aspect, the apparatus further includes an assistance unit, configured to: by using the first IP address, the first MAC address, and the first VTEP identifier, assist the first host in establishing a second forwarding entry, and assist the first layer 2 gateway device in establishing a third forwarding entry, where in the second forwarding entry, a source IP address is the fourth IP address, a source MAC address is the fourth MAC address, a destination IP address is the first IP address, and a destination MAC address is the first MAC address, and the third forwarding entry is used to indicate that the first MAC address is corresponding to the first VTEP identifier.

With reference to the fourth embodiment of the second aspect, in a fifth embodiment of the second aspect, the apparatus further includes a receiving unit and a sending unit; the receiving unit is configured to receive a second address request packet that is from the first host and that passes the first layer 2 gateway device, where in the second address request packet, a source IP address is the fourth IP address, a source MAC address is the fourth MAC address, a source VTEP identifier is the fourth VTEP identifier, a destination IP address is the first IP address, and a destination VTEP identifier is the first VTEP identifier or a second multicast VTEP identifier; the assistance unit is configured to: determine that the destination IP address in the second address request packet is the first IP address; determine the first MAC address corresponding to the first IP address, and the first VTEP identifier corresponding to the first IP address; and generate a second address response packet based on the first IP address, the first MAC address, the first VTEP identifier, the fourth IP address, the fourth MAC address, and the fourth VTEP identifier, where in the second address response packet, a source VTEP identifier is the first VTEP identifier, a source IP address is the first IP address, a source MAC address is the first MAC address, a destination IP address is the fourth IP address, a destination MAC address is the fourth MAC address, and a destination VTEP identifier is the fourth VTEP identifier; and the sending unit is configured to send the second address response packet, so that the first layer 2 gateway device establishes the third forwarding entry according to the received second address response packet, and the first host establishes the second forwarding entry according to the received second address response packet that is obtained after VXLAN decapsulation and that is sent by the first layer 2 gateway device.

With reference to the fifth embodiment of the second aspect, in a sixth embodiment of the second aspect, the apparatus further includes a discarding unit; the receiving unit is configured to receive a third address request packet that is from the first host and that passes the first layer 2 gateway device, where in the third address request packet, a source IP address is the fourth IP address, a source MAC address is the fourth MAC address, a source VTEP identifier is the fourth VTEP identifier, a destination IP address is the first IP address, and a destination VTEP identifier is the second VTEP identifier; and the discarding unit is configured to: determine that, in the third address request packet, the destination IP address is the first IP address, and the destination VTEP identifier is the second VTEP identifier; determine the first VTEP identifier corresponding to the first IP address; and discard the third address request packet.

With reference to the fourth embodiment of the second aspect, in a seventh embodiment of the second aspect, the apparatus further includes a sending unit; the assistance unit is specifically configured to: generate a notification packet, where in the notification packet, a source IP address is the first IP address, a source MAC address is the first MAC address, and a source VTEP identifier is the first VTEP identifier; and the sending unit is configured to send the notification packet, so that the first layer 2 gateway device establishes the third forwarding entry after receiving the notification packet, the first layer 2 gateway device performs VXLAN decapsulation on the notification packet, and sends, to the first host, the notification packet that is obtained after VXLAN decapsulation, and the first host establishes the second forwarding entry.

With reference to the seventh embodiment of the second aspect, in an eighth embodiment of the second aspect, the first assistance unit is specifically configured to generate the notification packet when it is determined that the first MAC address and/or the first IP address change/changes.

A third aspect relates to a data center of a VXLAN, where the data center includes a first layer 3 gateway device, a second layer 3 gateway device, and a first layer 2 gateway device separately connected to the first layer 3 gateway device and the second layer 3 gateway device; the first layer 2 gateway device is connected to a first host; the first layer 3 gateway device has a first Internet Protocol IP address, a second IP address, a first Media Access Control MAC address, a second MAC address, a first VXLAN tunnel end point VTEP identifier corresponding to the first IP address and the first MAC address, and a second VTEP identifier corresponding to the second IP address and the second MAC address; the second layer 3 gateway device has the first IP address, a third IP address, the first MAC address, a third MAC address, the first VTEP identifier, and a third VTEP identifier corresponding to the third IP address and the third MAC address; the first layer 2 gateway device has a fourth VTEP identifier; the first host has a fourth IP address and a fourth MAC address; the first IP address, the second IP address, the third IP address, and the fourth IP address are different from each other; the first MAC address, the second MAC address, the third MAC address, and the fourth MAC address are different from each other; and the first VTEP identifier, the second VTEP identifier, the third VTEP identifier, and the fourth VTEP identifier are different from each other.

With reference to the third aspect, in a first embodiment of the third aspect, the data center further includes a load balancing device, and the load balancing device is configured to forward, to the first layer 3 gateway device or the second layer 3 gateway device, a packet that is from the first host and in which a destination IP address is the first IP address, a destination MAC address is the first MAC address, and a destination VTEP identifier is the first VTEP identifier, to implement load balancing.

With reference to the third aspect or the first embodiment of the third aspect, in a second embodiment of the third aspect, the first layer 3 gateway device is the forwarding entry establishment apparatus in any one of the second aspect or the embodiments of the second aspect.

A fourth aspect relates to a forwarding entry establishment apparatus for a VXLAN, including a memory and a processor, where the memory is configured to store an instruction, the processor is configured to execute the instruction stored in the memory, and when the processor executes the instruction stored in the memory, the execution enables the processor to execute the method in any one of the first aspect or the embodiments of the first aspect.

A fifth aspect relates to a computer storage medium, where the computer storage medium stores program code, and the program code is used to instruct to execute the method in any one of the first aspect or the embodiments of the first aspect.

A sixth aspect relates to a forwarding entry establishment method for a VXLAN, where a data center of the VXLAN includes a first layer 3 gateway device, a second layer 3 gateway device, and a first layer 2 gateway device separately connected to the first layer 3 gateway device and the second layer 3 gateway device; the first layer 2 gateway device is connected to a first host; the first layer 3 gateway device has a first IP address, a second IP address, a first MAC address corresponding to the first IP address, a second MAC address corresponding to the second IP address, a first VXLAN tunnel end point VTEP identifier corresponding to the first IP address and the first MAC address, and a second VTEP identifier corresponding to the second IP address and the second MAC address; the second layer 3 gateway device has the first IP address, a third IP address, the first MAC address, a third MAC address corresponding to the third IP address, the first VTEP identifier, and a third VTEP identifier corresponding to the third IP address and the third MAC address; the first layer 2 gateway device has a fourth VTEP identifier; the first host has a fourth IP address and a fourth MAC address corresponding to the fourth IP address; the first IP address, the second IP address, the third IP address, and the fourth IP address are different from each other; the first MAC address, the second MAC address, the third MAC address, and the fourth MAC address are different from each other; and the first VTEP identifier, the second VTEP identifier, the third VTEP identifier, and the fourth VTEP identifier are different from each other; and the method includes: obtaining, by the first host, the first MAC address corresponding to the first IP address; and establishing a second forwarding entry based on the first IP address, the first MAC address, the fourth IP address, and the fourth MAC address, where in the second forwarding entry, a source IP address is the fourth IP address, a source MAC address is the fourth MAC address, a destination IP address is the first IP address, and a destination MAC address is the first MAC address.

With reference to the sixth aspect, in a first embodiment of the sixth aspect, the obtaining, by the first host, the first MAC address corresponding to the first IP address includes: obtaining, by using the first IP address, the fourth IP address, and the fourth MAC address, the first MAC address corresponding to the first IP address.

With reference to the first embodiment of the sixth aspect, in a second embodiment of the sixth aspect, the obtaining, by the first host by using the first IP address, the fourth IP address, and the fourth MAC address, the first MAC address corresponding to the first IP address includes: sending, by the first host, a second address request packet to the first layer 2 gateway device, where in the second address request packet, a source IP address is the fourth IP address, a source MAC address is the fourth MAC address, and a destination IP address is the first IP address; receiving, by the first host, a second address response packet, where in the second address response packet, a source IP address is the first IP address, a source MAC address is the first MAC address, a destination IP address is the fourth IP address, and a destination MAC address is the fourth MAC address; and obtaining, from the second address response packet, the first MAC address corresponding to the first IP address.

With reference to the first embodiment of the sixth aspect, in a third embodiment of the sixth aspect, before the obtaining, by the first host, the first MAC address corresponding to the first IP address, the method further includes: receiving a notification packet, where in the notification packet, a source IP address is the first IP address, and a source MAC address is the first MAC address; and the obtaining, by the first host, the first MAC address corresponding to the first IP address includes: obtaining, from the notification packet, the first MAC address corresponding to the first IP address.

A seventh aspect relates to a forwarding entry establishment method for a VXLAN, where a data center of the VXLAN includes a first layer 3 gateway device, a second layer 3 gateway device, and a first layer 2 gateway device separately connected to the first layer 3 gateway device and the second layer 3 gateway device; the first layer 2 gateway device is connected to a first host; the first layer 3 gateway device has a first IP address, a second IP address, a first MAC address corresponding to the first IP address, a second MAC address corresponding to the second IP address, a first VXLAN tunnel end point VTEP identifier corresponding to the first IP address and the first MAC address, and a second VTEP identifier corresponding to the second IP address and the second MAC address; the second layer 3 gateway device has the first IP address, a third IP address, the first MAC address, a third MAC address corresponding to the third IP address, the first VTEP identifier, and a third VTEP identifier corresponding to the third IP address and the third MAC address; the first layer 2 gateway device has a fourth VTEP identifier; the first host has a fourth IP address and a fourth MAC address corresponding to the fourth IP address; the first IP address, the second IP address, the third IP address, and the fourth IP address are different from each other; the first MAC address, the second MAC address, the third MAC address, and the fourth MAC address are different from each other; and the first VTEP identifier, the second VTEP identifier, the third VTEP identifier, and the fourth VTEP identifier are different from each other; and the method includes: obtaining, by the first layer 2 gateway device, the first VTEP identifier corresponding to the first MAC address; and establishing a third forwarding entry based on the first MAC address and the first VTEP identifier, where the third forwarding entry is used to indicate that the first MAC address is corresponding to the first VTEP identifier.

With reference to the seventh aspect, in a first embodiment of the seventh aspect, before the obtaining, by the first layer 2 gateway device, the first VTEP identifier corresponding to the first MAC address, the method further includes: receiving a second address request packet sent by the first host, where in the second address request packet, a source IP address is the fourth IP address, a source MAC address is the fourth MAC address, and a destination IP address is the first IP address; the obtaining, by the first layer 2 gateway device, the first VTEP identifier corresponding to the first MAC address includes: performing VXLAN encapsulation on the second address request packet, and broadcasting the second address request packet that is obtained after VXLAN encapsulation; receiving a second address response packet, where in the second address response packet, a source IP address is the first IP address, a source MAC address is the first MAC address, a source VTEP identifier is the first VTEP identifier, a destination IP address is the fourth IP address, a destination MAC address is the fourth MAC address, and a destination VTEP identifier is the fourth VTEP identifier; and obtaining, from the second address response packet, the first VTEP identifier corresponding to the first MAC address; and the method further includes: performing VXLAN decapsulation on the second address response packet, and sending, to the first host, the second address response packet that is obtained after VXLAN decapsulation.

With reference to the first embodiment of the seventh aspect, in a second embodiment of the seventh aspect, the performing VXLAN encapsulation on the second address request packet includes: performing, by the first layer 2 gateway device, VXLAN encapsulation on the second address request packet, to generate a plurality of second address request packets, where the plurality of second address request packets carry different destination VTEP identifiers, and the plurality of second address request packets include a packet in which a destination VTEP identifier is the first VTEP identifier, a packet in which a destination VTEP identifier is the second VTEP identifier, and a packet in which a destination VTEP identifier is the third VTEP identifier; or the performing VXLAN encapsulation on the second address request packet includes: encapsulating a second multicast VTEP identifier into the second address request packet.

With reference to the seventh aspect, in a third embodiment of the seventh aspect, before the obtaining, by the first layer 2 gateway device, the first VTEP identifier corresponding to the first MAC address, the method further includes: receiving a notification packet, where in the notification packet, a source IP address is the first IP address, a source MAC address is the first MAC address, and a source VTEP identifier is the first VTEP identifier; and the obtaining, by the first layer 2 gateway device, the first VTEP identifier corresponding to the first MAC address includes: determining, from the notification packet, the first VTEP identifier corresponding to the first MAC address.

An eighth aspect relates to a communication method for a VXLAN, where a data center of the VXLAN includes a first layer 3 gateway device, a second layer 3 gateway device, a first layer 2 gateway device separately connected to the first layer 3 gateway device and the second layer 3 gateway device, and a load balancing device separately connected to the first layer 3 gateway device and the second layer 3 gateway device; the first layer 2 gateway device is connected to a first host; the first layer 3 gateway device has a first IP address, a second IP address, a first MAC address corresponding to the first IP address, a second MAC address corresponding to the second IP address, a first VXLAN tunnel end point VTEP identifier corresponding to the first IP address and the first MAC address, and a second VTEP identifier corresponding to the second IP address and the second MAC address; the second layer 3 gateway device has the first IP address, a third IP address, the first MAC address, a third MAC address corresponding to the third IP address, the first VTEP identifier, and a third VTEP identifier corresponding to the third IP address and the third MAC address; the first layer 2 gateway device has a fourth VTEP identifier; the first host has a fourth IP address and a fourth MAC address corresponding to the fourth IP address; the first IP address, the second IP address, the third IP address, and the fourth IP address are different from each other; the first MAC address, the second MAC address, the third MAC address, and the fourth MAC address are different from each other; the first VTEP identifier, the second VTEP identifier, the third VTEP identifier, and the fourth VTEP identifier are different from each other; and the method includes:

receiving, by the load balancing device, a traffic packet, where in the traffic packet, a source IP address is the fourth IP address, a source MAC address is the fourth MAC address, a source VTEP identifier is the fourth VTEP identifier, a destination IP address is the first IP address, a destination MAC address is the first MAC address, and a destination VTEP identifier is the first VTEP identifier; and forwarding the traffic packet to the first layer 3 gateway device or the second layer 3 gateway device, to implement load balancing.

With reference to the eighth aspect, in a first embodiment of the eighth aspect, the load balancing device and the first layer 2 gateway device are integrated into a same device.

With reference to the eighth aspect, in a second embodiment of the eighth aspect, the load balancing device and the first layer 2 gateway device are disposed in different devices.

A ninth aspect relates to a host, configured to execute the method in any one of the sixth aspect or the embodiments of the sixth aspect. Specifically, the host includes a module or a unit configured to execute the method in any one of the sixth aspect or the embodiments of the sixth aspect.

A tenth aspect relates to a layer 2 gateway device, configured to execute the method in any one of the seventh aspect or the embodiments of the seventh aspect. Specifically, the device includes a module or a unit configured to execute the method in any one of the seventh aspect or the embodiments of the seventh aspect.

An eleventh aspect relates to a load balancing device, configured to execute the method in any one of the eighth aspect or the embodiments of the eighth aspect. Specifically, the device includes a module or a unit configured to execute the method in any one of the eighth aspect or the embodiments of the eighth aspect.

A twelfth aspect relates to a host, including a memory and a processor, where the memory is configured to store an instruction, the processor is configured to execute the instruction stored in the memory, and when the processor executes the instruction stored in the memory, the execution enables the processor to execute the method in any one of the sixth aspect or the embodiments of the sixth aspect.

A twelfth aspect relates to a layer 2 gateway device, including a memory and a processor, where the memory is configured to store an instruction, the processor is configured to execute the instruction stored in the memory, and when the processor executes the instruction stored in the memory, the execution enables the processor to execute the method in any one of the seventh aspect or the embodiments of the seventh aspect.

A thirteenth aspect relates to a load balancing device, including a memory and a processor, where the memory is configured to store an instruction, the processor is configured to execute the instruction stored in the memory, and when the processor executes the instruction stored in the memory, the execution enables the processor to execute the method in any one of the eighth aspect or the embodiments of the eighth aspect.

A fourteenth aspect relates to a computer storage medium, where the computer storage medium stores program code, and the program code is used to instruct to execute the method in any one of the sixth aspect or the embodiments of the sixth aspect.

A fifteenth aspect relates to a computer storage medium, where the computer storage medium stores program code, and the program code is used to instruct to execute the method in any one of the seventh aspect or the embodiments of the seventh aspect.

A sixteenth aspect relates to a computer storage medium, where the computer storage medium stores program code, and the program code is used to instruct to execute the method in any one of the eighth aspect or the embodiments of the eighth aspect.

BRIEF DESCRIPTION OF DRAWINGS

To describe the technical solutions in the embodiments of the disclosure more clearly, the following briefly describes the accompanying drawings required for describing the embodiments. Apparently, the accompanying drawings in the following description show merely some embodiments of the disclosure, and a person of ordinary skill in the art may still derive other drawings from these accompanying drawings without creative efforts.

FIG. 2 is a schematic flowchart of a forwarding entry establishment method for a VXLAN according to an embodiment of the disclosure;

DESCRIPTION OF EMBODIMENTS

The following clearly describes the technical solutions in the embodiments of the disclosure with reference to the accompanying drawings in the embodiments of the disclosure. Apparently, the described embodiments are some but not all of the embodiments of the disclosure. All other embodiments obtained by a person of ordinary skill in the art based on the embodiments of the disclosure without creative efforts shall fall within the protection scope of the disclosure.

Figure 1:
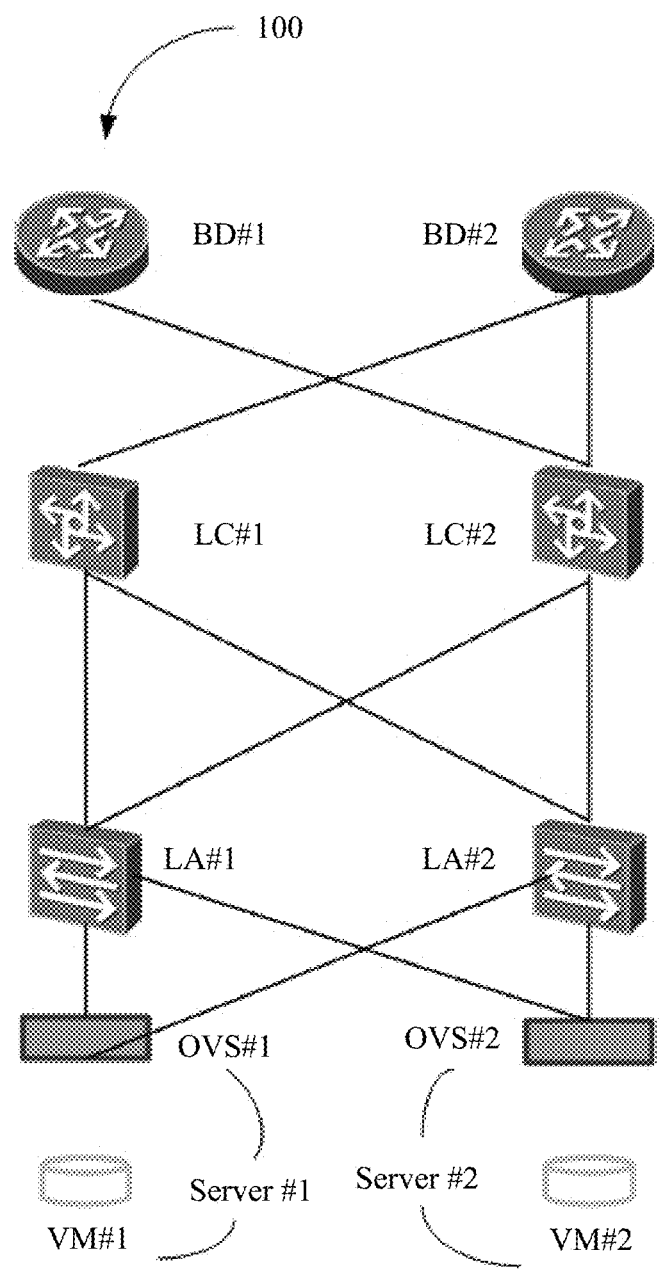
FIG. 1 is a schematic diagram of an application scenario according to an embodiment of the disclosure.
Figure 3:
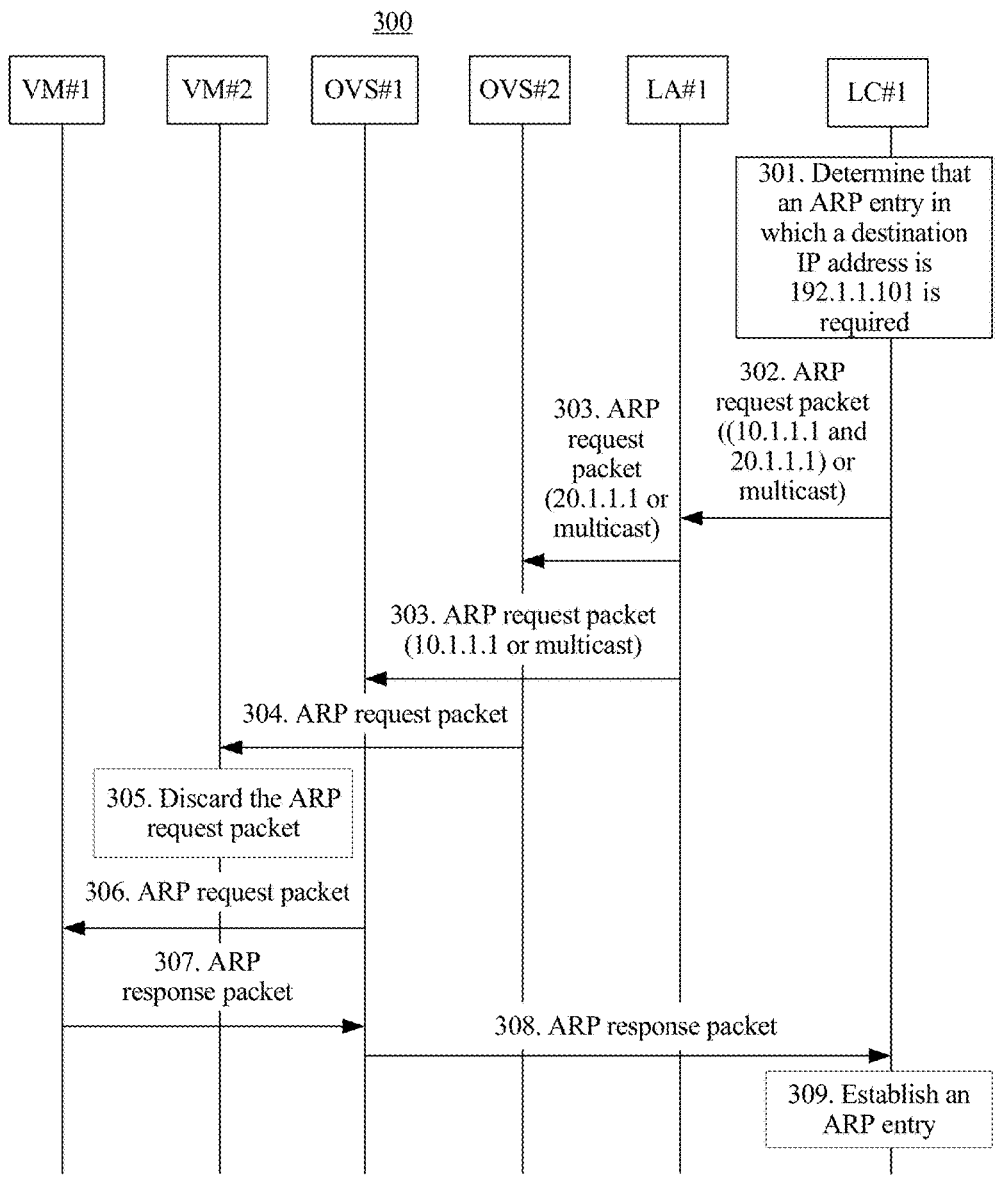
FIG. 3 is a schematic flowchart of a forwarding entry establishment method for a VXLAN according to an embodiment of the disclosure.

FIG. 1 is a schematic diagram of a communications system 100 according to an embodiment of the disclosure. As shown in FIG. 1, the communications system 100 may include boundary (Boundary) routers BD#1 and BD#2, local center (Local Center, LC) switches LC#1 and LC#2, local access (Local Access, LA) switches LA#1 and LA#2, a server #1, and a server #2. The server may include an Open vSwitch (Open vSwitch, OVS) and a virtual machine (Virtual machine, VM). For example, the server #1 includes an OVS#1 and a VM#1, and the server #2 includes an OVS#2 and a VM#2.

The BD#1 and the BD#2 may have a same autonomous system (Autonomous System, AS) number X, the LC#1 and the LC#2 may have a same AS number Y, and the LA#1 and the LA#2 may have a same AS number, for example, AS 1001. That two devices have a same AS number means that the two devices may establish a neighbor relationship based on a routing protocol, to perform route advertisement and learning.

The BD#1 and the BD#2 may forward traffic between a virtual machine in the communications system 100 and the outside (that is, the Internet outside the communications system 100).

The LC#1 and the LC#2 may be used as layer 3 gateway devices in a VXLAN, and may be configured to perform data forwarding in a layer 3 network of the VXLAN. The LC#1 and the LC#2 may have a same IP address, a same MAC address, and a same VTEP identifier, so that a packet from the virtual machine can be forwarded to the LC#1 or the LC#2, to implement load balancing. Alternatively, if there is another LC, and the LC, the LC#1, and the LC#2 have a same IP address, a MAC address, and a same VTEP identifier, the packet may be forwarded to the another LC to implement load balancing, and the LC receiving the packet may process the packet.

That is, the communications system may include at least two LCs that have a same IP address, a same MAC address, and a same VTEP identifier. Any one of the at least two LCs may process a packet in which a destination IP address is the same IP address, a destination MAC address is the same MAC address, and a destination VTEP identifier is the same VTEP identifier. The function implemented by the at least two LCs may be referred to as an "active-active" function. Certainly, the function may have another name. This is not limited in this embodiment of the disclosure.

The LA#1 and the LA#2 may be used as load balancing devices. Because the LC#1 and the LC#2 have a same IP address, a same MAC address, and a same VTEP identifier, traffic from the virtual machine may be forwarded by the LA, to implement load balancing. The traffic may be forwarded to the LC#1 or the LC#2, and the LC#1 or the LC#2 may send the traffic to the BD#1 or the BD#2.

In a communication scenario shown in the communications system 100, a layer 2 gateway device in the VXLAN may be the LA#1 or the LA#2, or may be the OVS#1 and the OVS#2.

If the layer 2 gateway device is the LA#1 and the LA#2, the LA#1 and the LA#2 may establish VXLAN tunnels with the LC#1 and the LC#2, and the LA#1 or the LA#2 performs VXLAN encapsulation, that is, encapsulates a source VTEP identifier of the VXLAN (that is, a VTEP identifier of the LA#1 or the LA#2) and encapsulates a destination VTEP identifier (which may be a VTEP identifier shared by the LC#1 and the LC#2, or a VTEP identifier exclusive to each of the LC#1 and the LC#2).

If the layer 2 gateway device is the OVS#1 and the OVS#2, the OVS#1 and the OVS#2 may establish VXLAN tunnels with the LC#1 and the LC#2, and the OVS#1 or the OVS#2 performs VXLAN encapsulation, that is, encapsulates a source VTEP identifier of the VXLAN (that is, a VTEP identifier of the OVS#1 or the OVS#2) and encapsulates a destination VTEP identifier (which may be a VTEP identifier shared by the LC#1 and the LC#2, or a VTEP identifier exclusive to each of the LC#1 and the LC#2). In this case, the LA#1 and the LA#2 do not perform VXLAN encapsulation, but perform traffic packet forwarding.

Traffic to be sent by the LC#1 or the LC#2 to a VM may be sent to a corresponding LA based on a destination IP address, a destination MAC address, and an encapsulated destination VTEP identifier; arrives at an OVS; and is sent by the OVS to the virtual machine. It is assumed that the traffic is destined for the VM#1, and the LC#1 does not have an ARP forwarding entry, that is, cannot determine a MAC address of the VM#1. The LC#1 broadcasts an ARP request packet. After receiving the ARP request packet, the VM#1 returns an ARP response packet. Specifically, the VM#1 encapsulates, into the packet, a source MAC address, a source IP address, a destination IP address, and a destination MAC address. Then, the layer 2 gateway device performs VXLAN encapsulation. If the LC#1 and the LC#2 have only a same IP address, a same MAC address, and a same VTEP identifier, and each have no exclusive IP, exclusive MAC, and exclusive VTEP identifier, after the LA#1 forwards the ARP response packet to implement load balancing, the ARP response packet may arrive at the LC#2 instead of the LC#1. Therefore, the LC#1 cannot establish an ARP entry based on the ARP response packet, and consequently cannot forward traffic destined for the VM#1.

Therefore, in this embodiment of the disclosure, in addition to a same IP address, a same MAC address, and a same VTEP identifier, different IP addresses, different MAC addresses, and different VTEP identifiers are further set for the LC#1 and the LC#2.

In this embodiment of the disclosure, if two LCs exist, two sets of addresses (each set of addresses includes an IP address, a MAC address, and a VTEP identifier) may be set for each of the two LCs. An IP address, a MAC address, and a VTEP identifier that are included in one of the two sets of addresses are respectively different from an IP address, a MAC address, and a VTEP identifier that are included in the other set of addresses. One set of addresses is exclusive to the LC, and the other set of addresses is shared by the LC and the other LC. If there are more than two LCs, each LC may have N (N is greater than 2) sets of addresses. One set of addresses is exclusive to the LC, and other sets of addresses may be shared by the LC and one or more LCs.

In this embodiment of the disclosure, an IP address, a MAC address, and a VTEP identifier of each LC may be set by a controller, that is, may be set by the controller according to a communication requirement; or may be manually set. In this embodiment of the disclosure, configuration of each address may be adjusted any time according to a communication requirement (for example, a load balancing requirement). For example, a set of addresses is added for an LC, and the set of addresses may be shared by the LC and another LC; or a set of addresses shared by the LC and another LC is removed.

A virtual IP address and a virtual MAC address may be deployed by using the Virtual Router Redundancy Protocol (Virtual Router Redundancy Protocol, VRRP). Specifically, layer 3 gateways may be grouped. Layer 3 gateways in a same group may have a same IP address. Then, a virtual MAC address may be obtained by means of calculation based on a configured virtual IP address.

When a real IP address, a real MAC address, and a real VTEP identifier are configured for the layer 3 gateway device, an existing IP address (including an existing real IP address and an existing virtual IP address), an existing MAC address (including an existing real MAC address and an existing virtual MAC address), and an existing VTEP identifier (including an existing real VTEP address and an existing virtual VTEP address) in a data center may be determined, so that the configured real IP address, the configured real MAC address, and the configured real VTEP identifier are different from the existing IP address, the existing MAC address, and the existing VTEP identifier.

In this embodiment of the disclosure, a VXLAN interface of the layer 3 gateway may be referred to as a vbdif interface. Certainly, this embodiment of the disclosure is not limited thereto.

For example, the LC#1 has IP addresses 192.1.1.1 and 192.1.1.2.255.255.255.0, and the LC#2 has IP addresses 192.1.1.1 and 192.1.1.3.255.255.255.0. The LC#1 has MAC addresses 1-1-1 and 2-2-2, and the LC#2 has MAC addresses 1-1-1 and 3-3-3. The LC#1 has VTEP identifiers 40.1.1.1 and 30.1.1.1, and the LC#2 has VTEP identifiers 50.1.1.1 and 30.1.1.1. Virtual machines have different IP addresses and different MAC addresses. For example, an IP address of the VM#1 is 192.1.1.101, and a MAC address of the VM#1 is 4-4-4; an IP address of the VM#2 is 192.1.1.102, and a MAC address of the VM#2 is 5-5-5.

The OVS is configured to control a VM that belongs to a same server as the OVS, that is, send a packet to the VM or forward a packet from the VM. One OVS may manage a plurality of VMs.

If the OVS is used as a layer 2 gateway device, different OVSs have different VTEP identifiers. For example, the OVS#1 has a VTEP identifier 10.1.1.1, and the OVS#2 has a VTEP identifier 20.1.1.1.

In this embodiment of the disclosure, an IP address and a MAC address are jointly corresponding to a VTEP identifier. For example, the IP address 192.1.1.1 and the MAC address 1-1-1 are corresponding to the VTEP identifier 30.1.1.1.

In the following, for ease of description, a same IP address of at least two layer 3 gateway devices is referred to as a virtual IP address, and different IP addresses of the at least two layer 3 gateway devices are referred to as real IP addresses; a same MAC address is referred to as a virtual MAC address, and different MAC addresses are referred to as real MAC addresses; a same VTEP identifier is referred to as a virtual VTEP identifier, and different VTEP identifiers are referred to as real VTEP identifiers. For example, the LC#1 and the LC#2 share a virtual IP address 192.1.1.1, and respectively have a real IP address 192.1.1.2.255.255.255.0 and a real IP address 192.1.1.3.255.255.255.0. The LC#1 and the LC#2 share a virtual MAC address 1-1-1, and respectively have a real MAC address 2-2-2 and a real MAC address 3-3-3. The LC#1 and the LC#2 share a virtual VTEP identifier 30.1.1.1, and respectively have a real VTEP identifier 40.1.1.1 and a real VTEP identifier 50.1.1.1.

It should be understood that although FIG. 1 shows only two BDs, two LCs, two servers, and the like, FIG. 1 is only for illustration instead of indicating that the communications system used in the disclosure is limited thereto. In the communications system used in the disclosure, different quantities of BDs, LCs, servers, and the like may be disposed according to a requirement.

It should be further understood that a same communications system may include an OVS used as a layer 2 gateway device, and also include an LA used as a layer 2 gateway device. One OVS may manage a plurality of virtual machines. For a virtual machine of the plurality of virtual machines, the OVS may be used as a layer 2 gateway device corresponding to the virtual machine. For another virtual machine of the plurality of virtual machines, the LA may be used as a layer 2 gateway device corresponding to the another virtual machine.

It should be further understood that the communications system 100 may include a data center and a host. The data center includes a layer 3 gateway device and a layer 2 gateway device, and may further include a load balancing device.

It should be further understood that the communications system 100 shown in FIG. 1 is only an application scenario of this embodiment of the disclosure and constitutes no limitation to an application scenario of the disclosure. For example, the LA may be used as a layer 3 gateway device in the VXLAN, and the OVS may be used as a layer 2 gateway device in the VXLAN. One layer 2 gateway device may be connected to at least two layer 3 gateway devices. For example, in the communications system 100 shown in FIG. 1, each layer 3 gateway device may directly communicate with VMs in the entire communications system. This type of layer 3 gateway device may be referred to as a centralized gateway device. However, the layer 3 gateway device in this embodiment of the disclosure may directly communicate only with some VMs. This type of layer 3 gateway device may be referred to as a distributed layer 3 gateway. It should be understood that a host directly communicating with a layer 3 gateway device, as mentioned in this embodiment, means that communication is performed between the host and the layer 3 gateway device without using another layer 3 gateway device.

FIG. 2 is a schematic flowchart of a forwarding entry establishment method 200 for a VXLAN according to an embodiment of the disclosure. A data center of the VXLAN includes a first layer 3 gateway device, a second layer 3 gateway device, and a first layer 2 gateway device separately connected to the first layer 3 gateway device and the second layer 3 gateway device. The first layer 2 gateway device is connected to a first host. The host mentioned in this embodiment of the disclosure may be a virtual machine. For example, in the communications system 100 shown in FIG. 1, the LC#1 is used as the first layer 3 gateway device described herein, the LC#2 is used as the second layer 3 gateway device described herein, the LA#1 may be used as the first layer 2 gateway device described herein, and the VM#1 may be used as the first host. The LA#1 is used as a layer 2 gateway device between the VM#1 and the LC#1, and may establish a VXLAN tunnel with the LC#1. Alternatively, the LA#1 may be used as a layer 2 gateway device between the VM#1 and the LC#2, and may establish a VXLAN tunnel with the LC#2.

The first layer 3 gateway device has a first IP address, a second IP address, a first MAC address, a second MAC address, a first VXLAN tunnel end point VTEP identifier corresponding to the first IP address and the first MAC address, and a second VTEP identifier corresponding to the second IP address and the second MAC address. The second layer 3 gateway device has the first IP address, a third IP address, the first MAC address, a third MAC address, the first VTEP identifier, and a third VTEP identifier corresponding to the third IP address and the third MAC address. The first layer 2 gateway device has a fourth VTEP identifier. The first host has a fourth IP address and a fourth MAC address. The first IP address, the second IP address, the third IP address, and the fourth IP address are different from each other. The first MAC address, the second MAC address, the third MAC address, and the fourth MAC address are different from each other. The first VTEP identifier, the second VTEP identifier, the third VTEP identifier, and the fourth VTEP identifier are different from each other. The method may include step 210 and step 220.

210. The first layer 3 gateway device obtains the fourth MAC address of the first host and the fourth VTEP identifier of the first layer 2 gateway device by using the second IP address, the second MAC address, the second VTEP identifier, and the fourth IP address, where the second IP address is an IP address exclusive to the first layer 3 gateway device, the second MAC address is a MAC address exclusive to the first layer 3 gateway device, and the second VTEP identifier is a VTEP identifier exclusive to the first layer 3 gateway device.

Specifically, when the first layer 3 gateway device needs to establish a forwarding entry with the first host, the first layer 3 gateway device may obtain the IP address exclusive to the first layer 3 gateway device, that is, the second IP address; the MAC address exclusive to the first layer 3 gateway device, that is, the second MAC address; and the VTEP identifier exclusive to the first layer 3 gateway device, that is, the second VTEP identifier; and obtain the IP address of the first host, that is, the fourth IP address. Therefore, the first layer 3 gateway device may generate a first address request packet based on the second IP address, the second MAC address, the second VTEP identifier, and the fourth IP address. In the first address request packet, a source IP address is the second IP address, a source MAC address is the second MAC address, a source VTEP identifier is the second VTEP identifier, and a destination IP address is the fourth IP address. After receiving the first address request packet, the first layer 2 gateway device performs VXLAN decapsulation, and sends, to the first host, the first address request packet that is obtained after VXLAN decapsulation. The first host generates a first address response packet based on the first address request packet, and sends the first address response packet to the first layer 2 gateway device. The first layer 2 gateway device performs VXLAN encapsulation on the first address response packet, and sends, to the first layer 3 gateway device, the first address response packet that is obtained after VXLAN encapsulation. Therefore, the first layer 3 gateway device may obtain the fourth MAC address of the first host and the fourth VTEP identifier of the first layer 2 gateway device based on the first address response packet.

220. Establish a first forwarding entry based on the second IP address, the second MAC address, the second VTEP identifier, the fourth IP address, the fourth MAC address, and the fourth VTEP identifier, where in the first forwarding entry, a source IP address is the second IP address, a source MAC address is the second MAC address, a destination IP address is the fourth IP address, and a destination MAC address is the fourth MAC address, and the first forwarding entry is used to indicate that the fourth MAC address is corresponding to the fourth VTEP identifier.

Optionally, in this embodiment of the disclosure, at least two sets of addresses (each set of addresses includes an IP address, a MAC address, and a VTEP identifier) are configured for a layer 3 gateway device. One set of addresses is exclusive to the layer 3 gateway device, and the other set of addresses is shared by the layer 3 gateway device and another device. The layer 3 gateway device may share different addresses with different layer 3 gateway devices, or may share a same address with different layer 3 gateway devices. Optionally, in this embodiment of the disclosure, an IP address, a MAC address, and a VTEP identifier of each layer 3 gateway device may be set by a controller, that is, may be set by the controller according to a communication requirement; or may be manually set. In this embodiment of the disclosure, configuration of each address may be adjusted any time according to a communication requirement (for example, a load balancing requirement). For example, a set of addresses is added for a layer 3 gateway device, and the set of addresses may be shared by the layer 3 gateway device and another LC; or a set of addresses shared by the LC and another LC is removed.

Optionally, a server to which the first host belongs is a silent server, that is, a server that does not actively send a packet.

Optionally, the first address request packet may be referred to as an Address Resolution Protocol (Address Resolution Protocol, ARP) request packet, and the first address response packet may be referred to as an ARP response packet.

Optionally, the first forwarding entry may be divided into two forwarding sub-entries. One forwarding sub-entry may be referred to as an ARP entry. In the ARP entry, a source IP address is the second IP address, a source MAC address is the second MAC address, a destination IP address is the fourth IP address, and a destination MAC address is the fourth MAC address. The other forwarding sub-entry may be referred to as a MAC forwarding entry that is used to: indicate that a VTEP identifier corresponding to the fourth MAC address is the fourth VTEP identifier, and perform VXLAN encapsulation.

Optionally, the data center includes a plurality of layer 2 gateway devices. Each of the plurality of layer 2 gateway devices is connected to the first layer 3 gateway device. The plurality of layer 2 gateway devices include the first layer 2 gateway device. For example, in the communications system 100 shown in FIG. 1, the data center includes a plurality of layer 2 gateway devices: the OVS#1 and the OVS#2.

In this case, the first layer 3 gateway device sends a plurality of first address request packets. The plurality of first address request packets are in a one-to-one correspondence with the plurality of layer 2 gateway devices. Each first address request packet carries a VTEP identifier of a corresponding layer 2 gateway device. Alternatively, the first layer 3 gateway device sends the first address request packet. A VTEP identifier in the first address request packet is a first multicast VTEP identifier.

In this embodiment of the disclosure, the first multicast VTEP identifier may be corresponding to a multicast group. When members in the multicast group communicate with each other, a destination VTEP identifier may be the multicast VTEP identifier. After receiving the packet carrying the first multicast VTEP identifier, a member in the multicast group determines that the packet carries the first multicast VTEP identifier, and may perform VXLAN decapsulation on the packet and perform corresponding subsequent processing. In addition to the first layer 3 gateway device, the multicast group corresponding to the first multicast VTEP identifier may include a plurality of layer 2 gateway devices connected to the first layer 3 gateway device, or may include all layer 2 gateway devices included in the entire data center, or certainly, may further include another layer 3 gateway device.

For ease of understanding, the following uses the communications system 100 shown in FIG. 1 as an example, to describe a schematic flowchart of a forwarding entry establishment method 300 for a VXLAN according to an embodiment of the disclosure.

301. The LC#1 determines that an ARP forwarding entry in which a destination IP address is 192.1.1.101 needs to be obtained. For example, when maintaining ARP forwarding entries, the LC#1 finds that the ARP forwarding entry in which the destination IP address is 192.1.1.101 is missing; or the LC#1 needs to forward traffic to a VM whose destination IP address is 192.1.1.101. The IP address 192.1.1.101 may be an IP address of a silent server.

302. The LC#1 sends an ARP request packet, where in the ARP request packet, a source IP address is a real IP address of the LC#1, a source MAC address is a real MAC address of the LC#1, a source VTEP identifier is a real VTEP identifier of the LC#1, and a destination IP address is 192.1.1.101.

The ARP request packet may be broadcast by means of head-end replication or multicast.

Head-end replication means replicating the ARP request packet to generate a plurality of packets, each packet carries one VTEP identifier, and different packets carry different VTEP identifiers. For example, if layer 2 gateway devices are the OVS#1 and the OVS#2, the ARP request packet may be replicated to generate a plurality of packets, and a destination VTEP identifier is encapsulated into each packet, that is, a VTEP identifier 10.1.1.1 of the OVS#1 and a VTEP identifier 20.1.1.1 of the OVS#2.

Multicast means encapsulating a destination VTEP identifier in the ARP request packet as a multicast VTEP identifier. For example, the multicast VTEP identifier is corresponding to a multicast group, and the multicast group includes the following members: the LC#1, the LC#2, the OVS#1, and the OVS#2.

303. The ARP request packet sent by the LC#1 is forwarded by the LA#1 to the OVS#1 and the OVS#2.

For example, if head-end replication is used, an ARP request packet in which a destination VTEP identifier is 10.1.1.1 is sent to the OVS#1, and an ARP request packet in which a destination VTEP identifier is 20.1.1.1 is sent to the OVS#2. If multicast is used, the ARP request packet carrying the multicast VTEP address is separately sent to the OVS#1 and the OVS#2.

304. The OVS#2 receives an ARP request packet in which a destination VTEP identifier is 20.1.1.1 or the ARP request packet carrying a multicast VTEP identifier, performs VXLAN decapsulation on the ARP request packet, and broadcasts the ARP request packet to a VM managed by the OVS#2.

305. After receiving the ARP request packet, the VM#2 finds that the destination IP address in the ARP request packet is not an IP address of the VM#2, and discards the ARP request packet.

306. The OVS#1 receives an ARP request packet in which a destination VTEP identifier is 10.1.1.1 or the ARP request packet carrying a multicast VTEP identifier, performs VXLAN decapsulation, and broadcasts the ARP request packet to a VM managed by the OVS#1.

307. The VM#1 finds that the destination IP address in the ARP request packet is an IP address of the VM#1, and generates an ARP response packet based on the ARP request packet, where in the ARP response packet, a source IP address is the IP address of the VM#1, a source MAC address is a MAC address of the VM#1, a destination IP address is the real IP address of the LC#1, and a destination MAC address is the real MAC address of the LC#1.

308. The VM#1 sends the ARP response packet to the OVS#1; and the OVS#1 performs VXLAN encapsulation on the ARP response packet, that is, encapsulates the VTEP identifier of the OVS#1 as a source VTEP address, and encapsulates the real VTEP identifier of the LC#1 as a destination VTEP identifier (it may be determined, based on the ARP request packet, that the real VTEP identifier needs to be encapsulated into the ARP response packet), and sends the ARP response packet that is obtained after VXLAN encapsulation, where the VXLAN response packet arrives at the LC#1 after passing the LA#1.

309. The LC#1 receives the ARP response packet, where in the ARP response packet, the source IP address is the IP address of the VM#1, the source MAC address is the MAC address of the VM#1, the destination IP address is the real IP address of the LC#1, and the destination MAC address is the real MAC address of the LC#1; determines, from the ARP response packet, a VTEP identifier of a layer 2 gateway device corresponding to the VM#1, to establish a MAC forwarding entry; and obtains the MAC address of the VM#1 from the ARP response packet, to establish an ARP forwarding entry. In the ARP forwarding entry, a source IP address is the real IP address of the LC#1, a MAC address is the real MAC address of the LC#1, a destination IP address is the IP address of the VM#1, and a destination MAC address is the MAC address of the VM#1. The MAC forwarding entry is used to indicate that the MAC address of the VM#1 is corresponding to the VTEP identifier of the OVS#1.

Therefore, in this embodiment of the disclosure, at least two layer 3 gateway devices have a shared IP address, that is, the foregoing virtual IP address, a shared MAC address (a virtual MAC address), and a shared VTEP identifier (a virtual VTEP identifier), and each have an exclusive IP address (a real IP address), an exclusive MAC address (a real MAC address), and an exclusive VTEP identifier (a real VTEP identifier). The layer 3 gateway device broadcasts an address request packet to a host based on the exclusive IP address, the exclusive MAC address, and the exclusive VTEP identifier. If an address response packet that is fed back by the host and that passes a layer 2 gateway device carries the exclusive IP address, the exclusive MAC address, and the exclusive VTEP identifier of the layer 3 gateway device, the address response packet is not sent to another layer 3 gateway device. Therefore, a forwarding entry can be correctly established, and traffic can be sent from the gateway device to the host device.

The foregoing describes in detail the method in which a layer 3 gateway device establishes a forwarding entry by using a real MAC address, a real IP address, and a real VTEP identifier. In this embodiment of the disclosure, by using a virtual IP address, a virtual MAC address, and a virtual VTEP identifier, the layer 3 gateway device may further assist the first host in establishing a second forwarding entry, and assist the first layer 2 gateway device in establishing a third forwarding entry. In the second forwarding entry, a source IP address is the fourth IP address, a source MAC address is the fourth MAC address, a destination IP address is the first IP address, and a destination MAC address is the first MAC address. The third forwarding entry is used to indicate that the first MAC address is corresponding to the first VTEP identifier.

Optionally, the first host obtains the first MAC address corresponding to the first IP address, and establishes the second forwarding entry based on the first IP address and the first MAC address.

Optionally, the first layer 2 gateway device obtains the first VTEP identifier corresponding to the first MAC address, and establishes the third forwarding entry based on the first MAC address and the first VTEP identifier.

Optionally, in this embodiment of the disclosure, after the first host establishes the second forwarding entry and the first layer 2 gateway device establishes the third forwarding entry, the first host may generate a traffic packet based on the second forwarding entry. In the traffic packet, a source IP address is the fourth IP address, a source MAC address is the fourth MAC address, a destination IP address is the first IP address, and a destination MAC address is the first MAC address. The first host may send the traffic packet to the first layer 2 gateway device. After receiving the traffic packet, the first layer 2 gateway device may perform VXLAN encapsulation based on the third forwarding entry. A source VTEP identifier is the fourth VTEP identifier, and a destination VTEP identifier is the first VTEP identifier. The first layer 2 gateway device may send the traffic packet to a load balancing device. The load balancing device may forward the packet to the first layer 3 gateway device or the second layer 3 gateway device, to implement load balancing.

Optionally, that the first host establishes the second forwarding entry and the first layer 2 gateway device establishes the third forwarding entry may be: The first host actively requests the establishment, or the first layer 3 gateway device instructs to establish the forwarding entry. The following describes in detail the two embodiments.

Embodiment 1

When the first host needs to send a traffic packet to a layer 3 gateway device, but stores no forwarding entry in which a destination is the layer 3 gateway device, the first host may generate an address request packet based on a preconfigured IP address of the layer 3 gateway device (the preconfigured IP address is an IP address shared by a plurality of layer 3 gateway devices), and the IP address and the MAC address of the first host, and send the address request packet. In the address request packet, a source IP address is the fourth IP address, a source MAC address is the fourth MAC address, and a destination IP address is the first IP address. After the address request packet arrives at the first layer 2 gateway device, the first layer 2 gateway device performs VXLAN encapsulation on the address request packet, and broadcasts the address request packet obtained after VXLAN encapsulation. The first layer 3 gateway device receives a second address request packet (obtained after VXLAN encapsulation is performed on the address request packet sent by the first host) that is from the first host and that passes the first layer 2 gateway device. In the second address request packet, a source IP address is the fourth IP address, a source MAC address is the fourth MAC address, a source VTEP identifier is the fourth VTEP identifier, a destination IP address is the first IP address, and a destination VTEP identifier is the first VTEP identifier or a second multicast VTEP identifier. A multicast group corresponding to the second multicast VTEP identifier includes a plurality of layer 3 gateway devices, and the plurality of layer 3 gateway devices include the first layer 3 gateway device. The first VTEP identifier and the second multicast VTEP identifier may be preset in the first layer 2 gateway device. The first layer 3 gateway device generates a second address response packet based on the first IP address, the first MAC address, and the first VTEP identifier. In the second address response packet, a source VTEP identifier is the first VTEP identifier, a source IP address is the first IP address, a source MAC address is the first MAC address, a destination IP address is the fourth IP address, a destination MAC address is the fourth MAC address, and a destination VTEP identifier is the fourth VTEP identifier. The first layer 3 gateway device sends the second address response packet. After receiving the second address response packet, the first layer 2 gateway device establishes the third forwarding entry, and the first layer 2 gateway device performs VXLAN decapsulation on the second address response packet, and sends, to the first host, the second address response packet that is obtained after VXLAN decapsulation, so that the first host establishes the second forwarding entry.

In this embodiment of the disclosure, the second multicast VTEP identifier may be corresponding to a multicast group. When members in the multicast group communicate with each other, the destination VTEP identifier may be the multicast VTEP identifier. After receiving the packet carrying the second multicast VTEP identifier, a member in the multicast group determines that the packet carries the second multicast VTEP identifier, and may perform VXLAN decapsulation on the packet and perform corresponding subsequent processing. In addition to the first layer 2 gateway device, the multicast group corresponding to the second multicast VTEP identifier may include a plurality of layer 3 gateway devices connected to the first layer 2 gateway device, or may include all layer 3 gateway devices included in the entire data center, or certainly, may further include another layer 2 gateway device.

Optionally, the first layer 3 gateway device receives a third address request packet (obtained after VXLAN encapsulation is performed on the address request packet sent by the first host) that is from the first host and that passes the first layer 2 gateway device, where in the third address request packet, a source IP address is the fourth IP address, a source MAC address is the fourth MAC address, a source VTEP identifier is the fourth VTEP identifier, a destination IP address is the first IP address, and a destination VTEP identifier is the second VTEP identifier; and discards the third address request packet.

Figure 4A:
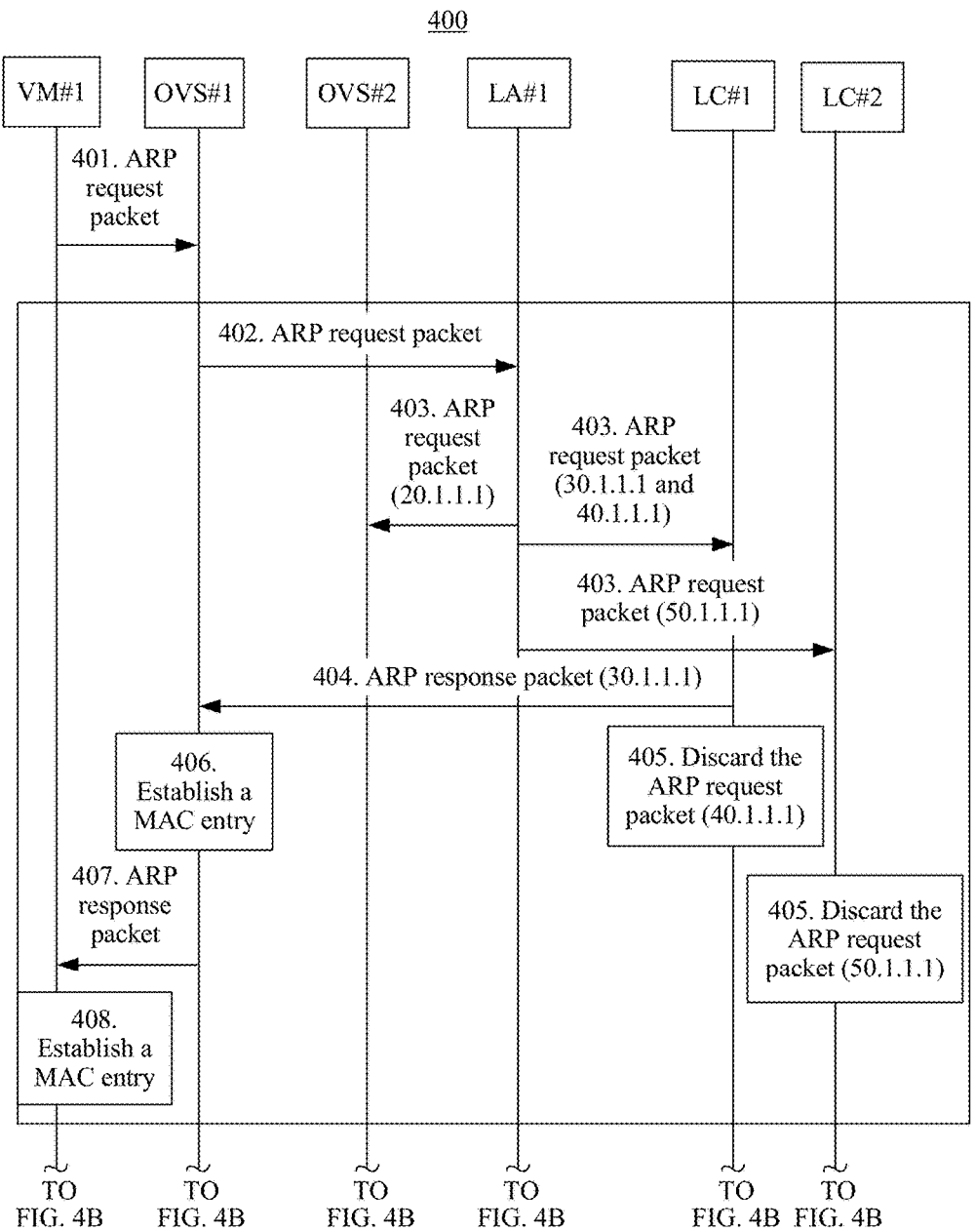
FIG. 4A and FIG. 4B are a schematic flowchart of a forwarding entry establishment method for a VXLAN according to an embodiment of the disclosure.
Figure 4B:
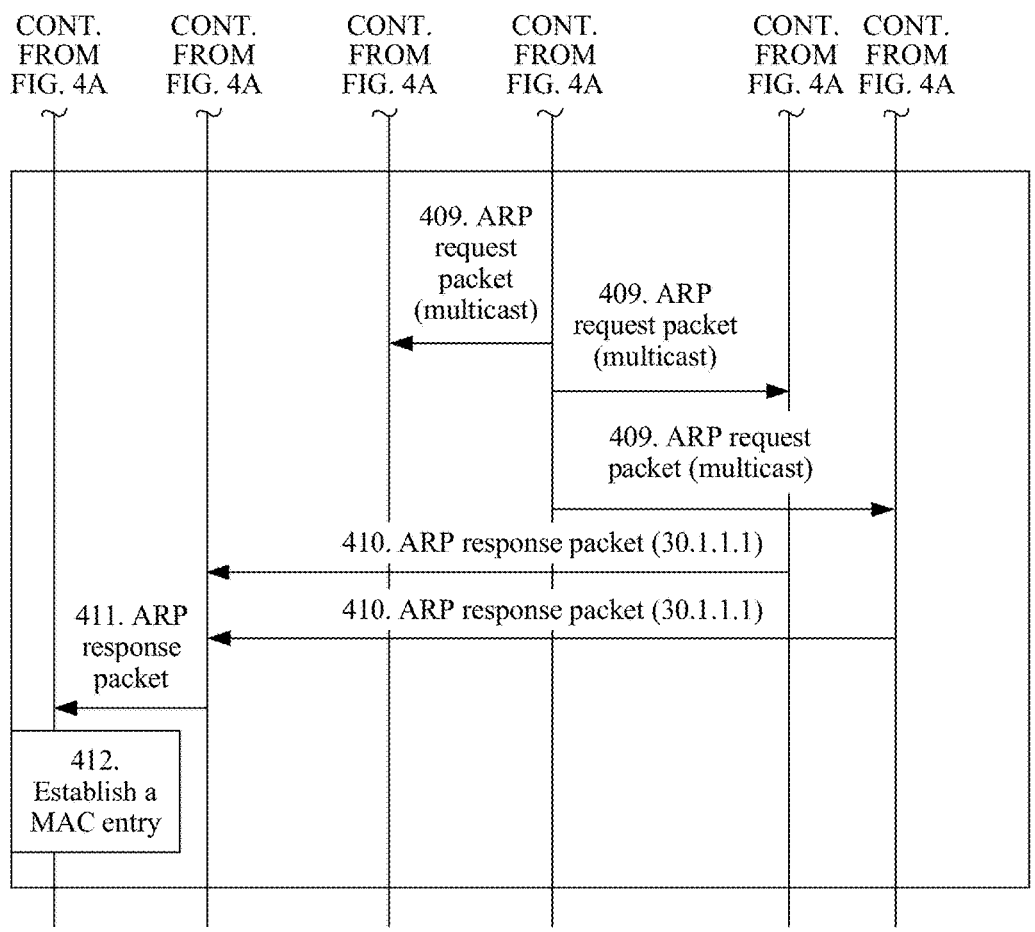

For ease of understanding, with reference to FIG. 4A and FIG. 4B, the following uses the shown communications system 100 as an example, to describe a schematic flowchart of a forwarding entry establishment method 400 for a VXLAN according to an embodiment of the disclosure.

401. The VM#1 sends an ARP request packet, where in the ARP request packet, a source IP address is an IP address of the VM#1, a source MAC address is a MAC address of the VM#1, and a destination IP address is a virtual IP address shared by the LC#1 and the LC#2.

402. After receiving the ARP request packet, the OVS#1 performs VXLAN encapsulation on the ARP request packet.

The OVS#1 may broadcast the ARP request packet by means of head-end replication or multicast, that is, perform VXLAN encapsulation and perform broadcasting.

Head-end replication means replicating the ARP request packet to generate a plurality of packets, each packet carries one VTEP identifier, and different packets carry different VTEP identifiers. For example, the ARP request packet may be replicated to generate a plurality of packets, and a destination VTEP identifier is encapsulated into each packet. For example, the packets generated by replicating the ARP request packet separately carry the following VTEP identifiers: a virtual VTEP identifier 30.1.1.1 shared by the LC#1 and the LC#2, a real VTEP identifier 40.1.1.1 of the LC#1, a real VTEP identifier 50.1.1.1 of the LC#2, and a VTEP identifier 20.1.1.1 of the OVS#2.

Multicast means encapsulating a destination VTEP identifier in the ARP request packet as a multicast VTEP identifier.

The multicast VTEP identifier is corresponding to a multicast group. When members in the multicast group communicate with each other, the destination VTEP identifier may be the multicast VTEP identifier. It is assumed that the multicast group herein includes the OVS#1, the OVS#2, the LC#1, and the LC#2. The multicast VTEP identifier may be preset in each member in the multicast group.

Step 403 to step 407 are about broadcasting the ARP request packet by means of head-end replication.

403. Because a plurality of ARP request packets may be generated after head-end replication is performed on the ARP request packet, the LA#1 sends, to the OVS#2, an ARP request packet in which a destination VTEP identifier is 20.1.1.1; forwards, to the LC#1 or the LC#2, an ARP request packet in which a destination VTEP identifier is 30.1.1.1, to implement load balancing; sends, to the LC#1, an ARP request packet in which a destination VTEP identifier is 40.1.1.1; and sends, to the LC#2, an ARP request packet in which a destination VTEP identifier is 50.1.1.1.

404. Assuming that the LA#1 forwards, to the LC#1, the ARP request packet in which the destination VTEP identifier is 30.1.1.1, to implement load balancing, because the destination IP address in the ARP request packet is a virtual IP address 192.1.1.1, and the VTEP identifier in the ARP request packet is a virtual VTEP identifier 30.1.1.1 corresponding to the virtual IP address 192.1.1.1, the LC#1 responds with an ARP response packet. In the ARP response packet, a source IP address is the virtual IP address 192.1.1.1, a source MAC address is a virtual MAC address 1-1-1, a source VTEP identifier is the virtual VTEP identifier 30.1.1.1, a destination IP address is the IP address 192.1.1.101 of the VM#1, a destination VTEP identifier is a VTEP identifier 10.1.1.1 of the OVS#1, and a destination MAC address is the MAC address 4-4-4 of the VM#1. The response packet sent by the LC#1 may be forwarded by the LA#1. For ease of illustration, this is not shown in the figure.

405. The LC#1 receives the ARP request packet in which the destination VTEP identifier is a real VTEP identifier 40.1.1.1, and discards the ARP request packet because the real VTEP identifier 40.1.1.1 is not corresponding to the virtual IP address 192.1.1.1 in the packet. The LC#2 receives the ARP request packet in which the destination VTEP identifier is a real VTEP identifier 50.1.1.1, and discards the ARP request packet because the real VTEP identifier 50.1.1.1 is not corresponding to the virtual IP address 192.1.1.1 in the packet.

It should be understood that after receiving the ARP request packet in which the destination VTEP identifier is 20.1.1.1, the OVS#2 may perform VXLAN decapsulation on the ARP request packet, and deliver, to a VM managed by the OVS#2, the packet that is obtained after VXLAN decapsulation. After receiving the ARP request packet, the VM managed by the OVS#2 discards the ARP request packet because the destination IP address in the ARP request packet is not an IP address of the VM. For ease of illustration, processing performed by the OVS#2 after receiving the ARP request packet is not shown.

406. The OVS#1 receives the ARP response packet sent by the LC#1, where in the ARP response packet, the source IP address is the virtual IP address 192.1.1.1, the source MAC address is the virtual MAC address 1-1-1, the source VTEP identifier is the virtual VTEP identifier 30.1.1.1, the destination IP address is the IP address 192.1.1.101 of the VM#1, the destination VTEP identifier is the VTEP identifier 10.1.1.1 of the OVS#1, and the destination MAC address is the MAC address 4-4-4 of the VM#1; and therefore may obtain, based on the ARP response packet, a VTEP identifier corresponding to the virtual IP address 192.1.1.1, and establish a MAC entry, where the MAC entry is used to indicate the VTEP identifier corresponding to the virtual IP address 192.1.1.1, that is, the virtual VTEP identifier 30.1.1.1.

407. The OVS#1 sends, to the VM#1, the ARP response packet that is obtained after VXLAN decapsulation.

408. The VM#1 receives the ARP response packet, where in the ARP response packet, the source IP address is the virtual IP address 192.1.1.1, the source MAC address is the virtual MAC address 1-1-1, the source VTEP identifier is the virtual VTEP identifier 30.1.1.1, the destination IP address is the IP address 192.1.1.101 of the VM#1, the destination VTEP identifier is the VTEP identifier 10.1.1.1 of the OVS#1, and the destination MAC address is the MAC address 4-4-4 of the VM#1; and may determine, based on the ARP response packet, a MAC address corresponding to the virtual address 192.1.1.1, and establish an ARP entry, where in the ARP entry, a source IP address is the IP address of the VM#1, a source MAC address is the MAC address of the VM#1, a destination IP address is the virtual IP address shared by the LC#1 and the LC#2, and a destination MAC address is a virtual MAC address shared by the LC#1 and the LC#2.

Step 409 to step 411 are about broadcasting the ARP request packet by means of multicast.

409. Because a destination VTEP identifier in the ARP request packet is a multicast VTEP identifier, the LA#1 sends the ARP request packet to the OVS#2, the LC#1, and the LC#2.

410. The LC#1 receives the ARP request packet, and the LC#1 responds with an ARP response packet because the destination IP address in the ARP request packet is a virtual IP address 192.1.1.1, where in the ARP response packet, a source IP address is the virtual IP address 192.1.1.1, a source MAC address is a virtual MAC address 1-1-1, a source VTEP identifier is a virtual VTEP identifier 30.1.1.1, a destination IP address is the IP address 192.1.1.101 of the VM#1, a destination VTEP identifier is a VTEP identifier 10.1.1.1 of the OVS#1, and a destination MAC address is the MAC address 4-4-4 of the VM#1; and the LC#2 receives the ARP request packet, and the LC#2 responds with an ARP response packet because the destination IP address in the ARP request packet is the virtual IP address 192.1.1.1, where in the ARP response packet, a source IP address is the virtual IP address 192.1.1.1, a source MAC address is the virtual MAC address 1-1-1, a source VTEP identifier is the virtual VTEP identifier 30.1.1.1, a destination IP address is the IP address 192.1.1.101 of the VM#1, a destination VTEP identifier is the VTEP identifier 10.1.1.1 of the OVS#1, and a destination MAC address is the MAC address 4-4-4 of the VM#1.

It should be understood that after receiving the ARP request packet in which the destination VTEP identifier is the multicast VTEP address, the OVS#2 may perform VXLAN decapsulation on the ARP request packet, and deliver, to a VM managed by the OVS#2, the packet that is obtained after VXLAN decapsulation. After receiving the ARP request packet, the VM managed by the OVS#2 discards the ARP request packet because the destination IP address in the ARP request packet is not an IP address of the VM. For ease of illustration, processing performed by the OVS#2 after receiving the ARP request packet is not shown.

411. The OVS#1 receives the ARP response packet sent by the LC#1, where in the ARP response packet, the source IP address is the virtual IP address 192.1.1.1, the source MAC address is the virtual MAC address 1-1-1, the source VTEP identifier is the virtual VTEP identifier 30.1.1.1, the destination IP address is the IP address 192.1.1.101 of the VM#1, the destination VTEP identifier is the VTEP identifier 10.1.1.1 of the OVS#1, and the destination MAC address is the MAC address 4-4-4 of the VM#1; and therefore may obtain, based on the ARP response packet, a VTEP identifier corresponding to the virtual IP address 192.1.1.1, and establish a MAC entry, where the MAC entry is used to indicate the VTEP identifier corresponding to the virtual IP address 192.1.1.1, that is, the virtual VTEP identifier 30.1.1.1.

412. The OVS#1 sends, to the VM#1, the ARP response packet that is obtained after VXLAN decapsulation.

413. The VM#1 receives the ARP response packet, where in the ARP response packet, the source IP address is the virtual IP address 192.1.1.1, the source MAC address is the virtual MAC address 1-1-1, the source VTEP identifier is the virtual VTEP identifier 30.1.1.1, the destination IP address is the IP address 192.1.1.101 of the VM#1, the destination VTEP identifier is the VTEP identifier 10.1.1.1 of the OVS#1, and the destination MAC address is the MAC address 4-4-4 of the VM#1; and may determine, based on the ARP response packet, a MAC address corresponding to the virtual address 192.1.1.1, and establish an ARP entry, where in the ARP entry, a source IP address is the IP address of the VM#1, a source MAC address is the MAC address of the VM#1, a destination IP address is the virtual IP address shared by the LC#1 and the LC#2, and a destination MAC address is a virtual MAC address shared by the LC#1 and the LC#2.

Embodiment 2

The first layer 3 gateway device instructs to establish the forwarding entry. The first layer 3 gateway device sends a notification packet. In the notification packet, a source IP address is the first IP address, a source MAC address is the first MAC address, and a source VTEP identifier is the first VTEP identifier. Therefore, after receiving the notification packet, the first layer 2 gateway device determines, from the notification packet, the first VTEP identifier corresponding to the first IP address, and establishes the third forwarding entry. The third forwarding entry is used to indicate that a VTEP identifier corresponding to the first IP address is the first VTEP identifier. The first layer 2 gateway device performs VXLAN decapsulation on the notification packet, and sends, to the first host, the packet that is obtained after VXLAN decapsulation, so that after receiving the notification packet, the first host determines, from the notification packet, that the first IP address is corresponding to the first MAC address, and establishes the second forwarding entry. In the second forwarding entry, the source IP address is the IP address of the host, the source MAC address is the MAC address of the host, the destination IP address is the first IP address, and the destination MAC address is the first MAC address.

Optionally, when determining that the first IP address or the first MAC address changes, the first layer 3 gateway device sends the foregoing notification packet.

Figure 5:
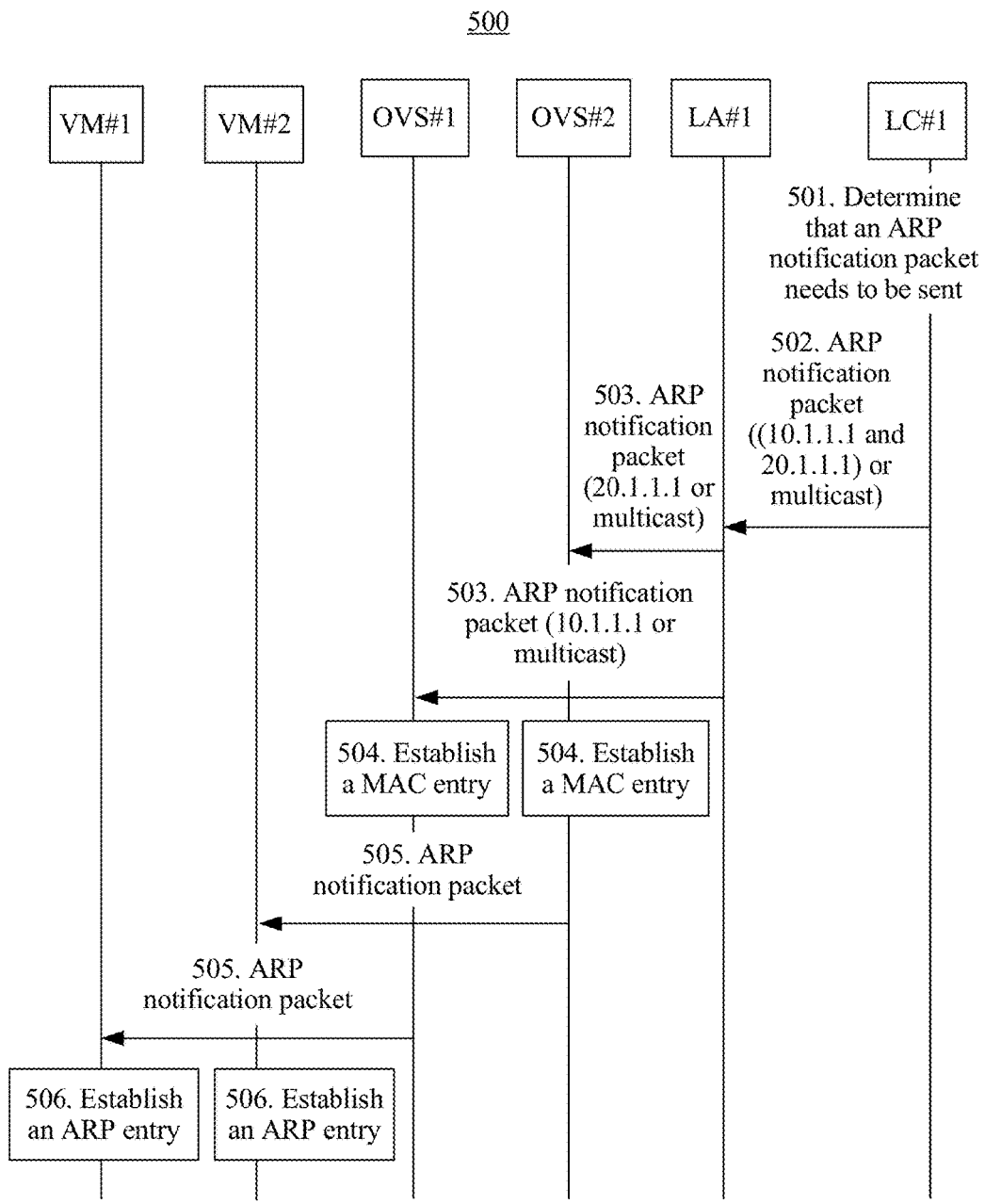
FIG. 5 is a schematic flowchart of a forwarding entry establishment method for a VXLAN according to an embodiment of the disclosure.

With reference to FIG. 5, the following uses the scenario shown in FIG. 1 as an example, to describe a schematic flowchart of a forwarding entry establishment method 500 for a VXLAN according to an embodiment of the disclosure.

501. The LC#1 determines that an ARP notification packet needs to be sent. For example, when a virtual IP address changes or a virtual MAC address changes, the LC#1 determines that an ARP notification packet needs to be sent. For example, the virtual IP address changes from 172.1.1.1 to 192.1.1.1, or the virtual MAC address changes from 5-5-5 to 1-1-1.

502. The LC#1 broadcasts the ARP notification packet. The ARP notification packet is used to indicate the virtual IP address, the virtual MAC address, and a virtual VTEP identifier of the LC#1. For example, the virtual IP address is 192.1.1.1, the virtual MAC address is 1-1-1, and the virtual VTEP identifier is 30.1.1.1.

The LC#1 may broadcast the ARP notification packet by means of head-end replication or multicast.

Head-end replication means replicating the ARP notification packet to generate a plurality of packets, each packet carries one VTEP identifier, and different packets carry different VTEP identifiers. For example, the ARP notification packet may be replicated to generate a plurality of packets, and a destination VTEP identifier is encapsulated into each packet, that is, a VTEP identifier 10.1.1.1 of the OVS#1 and a VTEP identifier 20.1.1.1 of the OVS#2.

Multicast means encapsulating a destination VTEP identifier in the ARP notification packet as a multicast VTEP identifier.

503. The notification packet sent by the LC#1 by means of broadcast is forwarded by the LA#1 to the OVS#1 and the OVS#2.

For example, if head-end replication is used, an ARP notification packet in which a destination VTEP identifier is 10.1.1.1 is sent to the OVS#1, and an ARP notification packet in which a destination VTEP identifier is 20.1.1.1 is sent to the OVS#2. If multicast is used, the ARP notification packet carrying the multicast VTEP address is separately sent to the OVS#1 and the OVS#2.

504. The OVS#1 and the OVS#2 each obtain the virtual IP address and the virtual VTEP identifier of the LC#1 from the ARP notification packet, and establish a MAC entry based on the virtual IP address and the virtual VTEP identifier, where the MAC entry is used to indicate that a VTEP identifier corresponding to the virtual IP address is the virtual VTEP identifier.

505. The OVS#1 and the OVS#2 each send, to a corresponding VM, the ARP notification packet that is obtained after VXLAN decapsulation.

506. After receiving the ARP notification packet, the VM#1 and the VM#2 each obtain the virtual MAC address and the virtual IP address of the LC#1 from the ARP notification packet, and establish an ARP entry based on the virtual MAC address and the virtual IP address. In an ARP entry established by the VM#1, a source IP address is an IP address of the VM#1, a source MAC address is a MAC address of the VM#1, a destination IP address is the virtual IP address shared by the LC#1 and the LC#2, and a destination MAC address is the virtual MAC address shared by the LC#1 and the LC#2. In an ARP entry established by the VM#2, a source IP address is an IP address of the VM#2, a source MAC address is a MAC address of the VM#2, a destination IP address is the virtual IP address shared by the LC#1 and the LC#2, and a destination MAC address is the virtual MAC address shared by the LC#1 and the LC#2.

In this embodiment of the disclosure, a plurality of layer 3 gateway devices have a shared IP address (a virtual IP address), a shared MAC address (a virtual MAC address), and a shared VTEP identifier (a virtual VTEP identifier). Each gateway device has an exclusive IP address (a real IP address), an exclusive MAC address (a real MAC address), and an exclusive VTEP identifier (a real VTEP identifier). The layer 3 gateway device may assist, by using the shared IP address (the virtual IP address), the shared MAC address (the virtual MAC address), and the shared VTEP identifier (the virtual VTEP identifier), a host and a layer 2 gateway device in establishing a forwarding entry. Therefore, the host and the layer 2 gateway device can send traffic by using the forwarding entry. Because a destination address in the traffic is corresponding to the plurality of layer 3 gateway devices, the traffic can be forwarded to any one of the plurality of layer 3 gateway devices, to implement balancing and an active-active function. In addition, the layer 3 gateway device broadcasts an address request packet to the host based on the exclusive IP address (the real IP address), the exclusive MAC address (the real MAC address), and the exclusive VTEP identifier (the real VTEP identifier) of the layer 3 gateway device. If an ARP response packet that is fed back by the host and that passes the layer 2 gateway device carries the exclusive IP address, the exclusive MAC address, and the exclusive VTEP identifier of the layer 3 gateway device, the address response packet is not sent to another layer 3 gateway device. Therefore, a forwarding entry can be correctly established, and traffic can be sent from the gateway device to the host device.

Figure 6:
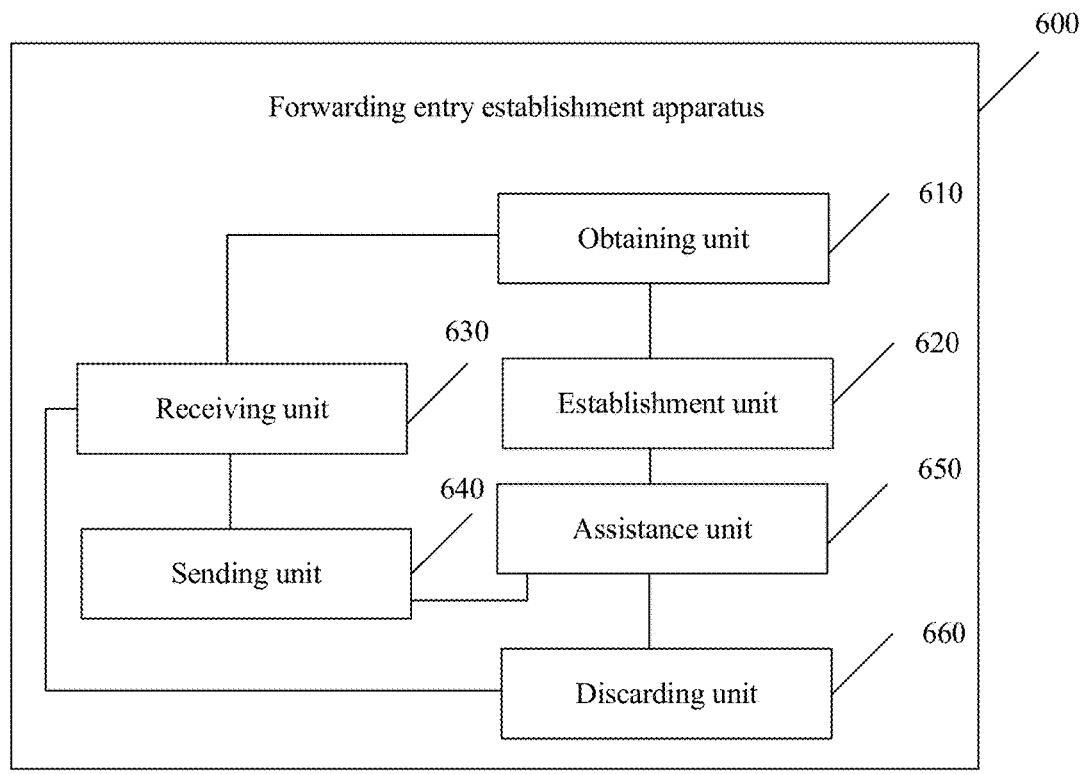
FIG. 6 is a schematic block diagram of a forwarding entry establishment apparatus for a VXLAN according to an embodiment of the disclosure.

FIG. 6 is a schematic block diagram of a forwarding entry establishment apparatus 600 for a VXLAN according to an embodiment of the disclosure. The forwarding entry establishment apparatus 600 may be configured to implement corresponding functions of the first layer 3 gateway device in the foregoing embodiments. A data center of the VXLAN includes a first layer 3 gateway device, a second layer 3 gateway device, and a first layer 2 gateway device separately connected to the first layer 3 gateway device and the second layer 3 gateway device. The first layer 2 gateway device is connected to a first host. The first layer 3 gateway device has a first Internet Protocol IP address, a second IP address, a first Media Access Control MAC address, a second MAC address, a first VXLAN tunnel end point VTEP identifier corresponding to the first IP address and the first MAC address, and a second VTEP identifier corresponding to the second IP address and the second MAC address. The second layer 3 gateway device has the first IP address, a third IP address, the first MAC address, a third MAC address, the first VTEP identifier, and a third VTEP identifier corresponding to the third IP address and the third MAC address. The first layer 2 gateway device has a fourth VTEP identifier. The first host has a fourth IP address and a fourth MAC address. The first IP address, the second IP address, the third IP address, and the fourth IP address are different from each other. The first MAC address, the second MAC address, the third MAC address, and the fourth MAC address are different from each other. The first VTEP identifier, the second VTEP identifier, the third VTEP identifier, and the fourth VTEP identifier are different from each other. The forwarding entry establishment apparatus 600 includes the first layer 3 gateway device.

The apparatus 600 includes an obtaining unit 610 and an establishment unit 620.

The obtaining unit 610 is configured to obtain the fourth MAC address of the first host and the fourth VTEP identifier of the first layer 2 gateway device by using the second IP address, the second MAC address, the second VTEP identifier, and the fourth IP address. The second IP address is an IP address exclusive to the first layer 3 gateway device, the second MAC address is a MAC address exclusive to the first layer 3 gateway device, and the second VTEP identifier is a VTEP identifier exclusive to the first layer 3 gateway device.

The establishment unit 620 is configured to establish a first forwarding entry based on the second IP address, the second MAC address, the second VTEP identifier, the fourth IP address, the fourth MAC address, and the fourth VTEP identifier. In the first forwarding entry, a source IP address is the second IP address, a source MAC address is the second MAC address, a destination IP address is the fourth IP address, and a destination MAC address is the fourth MAC address. The first forwarding entry is used to indicate that the fourth MAC address is corresponding to the fourth VTEP identifier.

Optionally, as shown in FIG. 6, the apparatus 600 further includes a receiving unit 630 and a sending unit 640.

Optionally, the sending unit 640 is configured to send a first address request packet. In the first address request packet, a source IP address is the second IP address, a source MAC address is the second MAC address, a source VTEP identifier is the second VTEP identifier, and a destination IP address is the fourth IP address. The receiving unit 630 is configured to receive a first address response packet that is from the first host and that passes the first layer 2 gateway device. In the first address response packet, a destination IP address is the second IP address, a destination MAC address is the second MAC address, a destination VTEP identifier is the second VTEP identifier, a source IP address is the fourth IP address, a source MAC address is the fourth MAC address, and a source VTEP identifier is the fourth VTEP identifier. The obtaining unit 610 is configured to obtain the fourth MAC address of the first host and the fourth VTEP identifier of the first layer 2 gateway device based on the first address response packet.

Optionally, the data center includes a plurality of layer 2 gateway devices. Each of the plurality of layer 2 gateway devices is connected to the first layer 3 gateway device. The plurality of layer 2 gateway devices include the first layer 2 gateway device. The sending unit 640 is further configured to: send a plurality of first address request packets, where the plurality of first address request packets are in a one-to-one correspondence with the plurality of layer 2 gateway devices, and each first address request packet carries a VTEP identifier of a corresponding layer 2 gateway device; or send the first address request packet, where a VTEP identifier in the first address request packet is a first multicast VTEP identifier.

Optionally, a server to which the first host belongs is a silent server.

Optionally, as shown in FIG. 6, the apparatus 600 further includes an assistance unit 650.

The assistance unit 650 is configured to: assist the first host in establishing a second forwarding entry, and assist the first layer 2 gateway device in establishing a third forwarding entry. In the second forwarding entry, a source IP address is the fourth IP address, a source MAC address is the fourth MAC address, a destination IP address is the first IP address, and a destination MAC address is the first MAC address. The third forwarding entry is used to indicate that the first MAC address is corresponding to the first VTEP identifier.

Optionally, the receiving unit 630 is configured to receive a second address request packet that is from the first host and that passes the first layer 2 gateway device. In the second address request packet, a source IP address is the fourth IP address, a source MAC address is the fourth MAC address, a source VTEP identifier is the fourth VTEP identifier, a destination IP address is the first IP address, and a destination VTEP identifier is the first VTEP identifier or a second multicast VTEP identifier. The assistance unit 650 is configured to: determine that the destination IP address in the second address request packet is the first IP address; determine the first MAC address corresponding to the first IP address, and the first VTEP identifier corresponding to the first IP address; and generate a second address response packet based on the first IP address, the first MAC address, the first VTEP identifier, the fourth IP address, the fourth MAC address, and the fourth VTEP identifier. In the second address response packet, a source VTEP identifier is the first VTEP identifier, a source IP address is the first IP address, a source MAC address is the first MAC address, a destination IP address is the fourth IP address, a destination MAC address is the fourth MAC address, and a destination VTEP identifier is the fourth VTEP identifier. The sending unit 640 is configured to send the second address response packet, so that the first layer 2 gateway device establishes the third forwarding entry according to the received second address response packet, and the first host establishes the second forwarding entry according to the received second address response packet that is obtained after VXLAN decapsulation and that is sent by the first layer 2 gateway device.

Optionally, as shown in FIG. 6, the apparatus 600 further includes a discarding unit 660.

The receiving unit 630 is configured to receive a third address request packet that is from the first host and that passes the first layer 2 gateway device. In the third address request packet, a source IP address is the fourth IP address, a source MAC address is the fourth MAC address, a source VTEP identifier is the fourth VTEP identifier, a destination IP address is the first IP address, and a destination VTEP identifier is the second VTEP identifier. The discarding unit 660 is configured to: determine that, in the third address request packet, the destination IP address is the first IP address, and the destination VTEP identifier is the second VTEP identifier; determine the first VTEP identifier corresponding to the first IP address; and discard the third address request packet.

Optionally, the assistance unit 650 is specifically configured to generate a notification packet. In the notification packet, a source IP address is the first IP address, a source MAC address is the first MAC address, and a source VTEP identifier is the first VTEP identifier. The sending unit 640 is configured to send the notification packet, so that the first layer 2 gateway device establishes the third forwarding entry according to the received notification packet, the first layer 2 gateway device performs VXLAN decapsulation on the notification packet, and sends, to the first host, the notification packet that is obtained after VXLAN decapsulation, and the first host establishes the second forwarding entry according to the received notification packet that is obtained after VXLAN decapsulation and that is sent by the first layer 2 gateway device.

Optionally, the assistance unit 650 is specifically configured to generate the notification packet when it is determined that the first MAC address and/or the first IP address change/changes.

The apparatus 600 shown in FIG. 6 may include the first layer 3 gateway device in the foregoing method embodiments, and may implement corresponding functions of the first layer 3 gateway device. For brevity, details are not described herein again.

Figure 7:
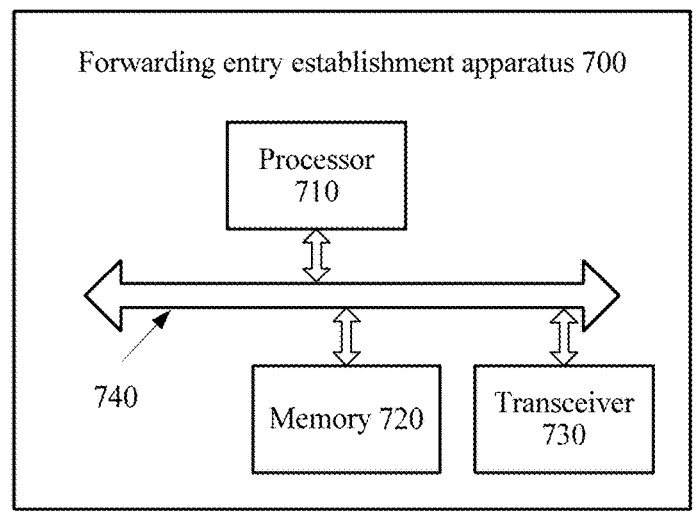
FIG. 7 is a schematic block diagram of a forwarding entry establishment apparatus for a VXLAN according to an embodiment of the disclosure.

FIG. 7 is a schematic block diagram of an apparatus 700 for a VXLAN according to an embodiment of the disclosure. A data center of the VXLAN includes a first layer 3 gateway device, a second layer 3 gateway device, and a first layer 2 gateway device separately connected to the first layer 3 gateway device and the second layer 3 gateway device. The first layer 2 gateway device is connected to a first host. The first layer 3 gateway device has a first Internet Protocol IP address, a second IP address, a first Media Access Control MAC address, a second MAC address, a first VXLAN tunnel end point VTEP identifier corresponding to the first IP address and the first MAC address, and a second VTEP identifier corresponding to the second IP address and the second MAC address. The second layer 3 gateway device has the first IP address, a third IP address, the first MAC address, a third MAC address, the first VTEP identifier, and a third VTEP identifier corresponding to the third IP address and the third MAC address. The first layer 2 gateway device has a fourth VTEP identifier. The first host has a fourth IP address and a fourth MAC address. The first IP address, the second IP address, the third IP address, and the fourth IP address are different from each other. The first MAC address, the second MAC address, the third MAC address, and the fourth MAC address are different from each other. The first VTEP identifier, the second VTEP identifier, the third VTEP identifier, and the fourth VTEP identifier are different from each other. The apparatus 700 includes the first layer 3 gateway device.

As shown in FIG. 7, the apparatus 700 includes a processor 710 and a memory 720. The memory 720 is configured to store a program instruction. The processor 710 may invoke the program instruction stored in the memory 720. Optionally, the apparatus 700 includes a transceiver 730, used for communication between the apparatus and the outside.

Optionally, the apparatus 700 may perform one or more steps of the first layer 3 gateway device in the method embodiments.

Specifically, the processor 710 may invoke the program instruction stored in the memory 720 to perform the following processing: obtaining the fourth MAC address of the first host and the fourth VTEP identifier of the first layer 2 gateway device by using the second IP address, the second MAC address, the second VTEP identifier, and the fourth IP address; and establishing a first forwarding entry based on the second IP address, the second MAC address, the second VTEP identifier, the fourth IP address, the fourth MAC address, and the fourth VTEP identifier. In the first forwarding entry, a source IP address is the second IP address, a source MAC address is the second MAC address, a destination IP address is the fourth IP address, and a destination MAC address is the fourth MAC address. The first forwarding entry is used to indicate that the fourth MAC address is corresponding to the fourth VTEP identifier. The second IP address is an IP address exclusive to the first layer 3 gateway device. The second MAC address is a MAC address exclusive to the first layer 3 gateway device. The second VTEP identifier is a VTEP identifier exclusive to the first layer 3 gateway device.

Optionally, the processor 710 may invoke the program instruction stored in the memory 720 to further perform the following processing: sending a first address request packet by using the transceiver 730, where in the first address request packet, a source IP address is the second IP address, a source MAC address is the second MAC address, a source VTEP identifier is the second VTEP identifier, and a destination IP address is the fourth IP address; receiving, by using the transceiver 730, a first address response packet that is from the first host and that passes the first layer 2 gateway device, where in the first address response packet, a destination IP address is the second IP address, a destination MAC address is the second MAC address, a destination VTEP identifier is the second VTEP identifier, a source IP address is the fourth IP address, a source MAC address is the fourth MAC address, and a source VTEP identifier is the fourth VTEP identifier; and determining the fourth MAC address of the first host and the fourth VTEP identifier of the first layer 2 gateway device based on the first address response packet.

Optionally, the data center includes a plurality of layer 2 gateway devices. Each of the plurality of layer 2 gateway devices is connected to the first layer 3 gateway device. The plurality of layer 2 gateway devices include the first layer 2 gateway device. The processor 710 may invoke the program instruction stored in the memory 720 to further perform the following processing: sending a plurality of first address request packets by using the transceiver 730, where the plurality of first address request packets are in a one-to-one correspondence with the plurality of layer 2 gateway devices, and each first address request packet carries a VTEP identifier of a corresponding layer 2 gateway device; or sending the first address request packet by using the transceiver 730, where a VTEP identifier in the first address request packet is a first multicast VTEP identifier.

Optionally, a server to which the first host belongs is a silent server.

Optionally, the processor 710 may invoke the program instruction stored in the memory 720 to further perform the following processing: by using the first IP address, the first MAC address, and the first VTEP identifier, assisting the first host in establishing a second forwarding entry, and assisting the first layer 2 gateway device in establishing a third forwarding entry. In the second forwarding entry, a source IP address is the fourth IP address, a source MAC address is the fourth MAC address, a destination IP address is the first IP address, and a destination MAC address is the first MAC address. The third forwarding entry is used to indicate that the first MAC address is corresponding to the first VTEP identifier.

Optionally, the processor 710 may invoke the program instruction stored in the memory 720 to further perform the following processing: receiving, by using the transceiver 730, a second address request packet that is from the first host and that passes the first layer 2 gateway device, where in the second address request packet, a source IP address is the fourth IP address, a source MAC address is the fourth MAC address, a source VTEP identifier is the fourth VTEP identifier, a destination IP address is the first IP address, and a destination VTEP identifier is the first VTEP identifier or a second multicast VTEP identifier; and determining that the destination IP address in the second address request packet is the first IP address; and determining the first MAC address corresponding to the first IP address, and the first VTEP identifier corresponding to the first IP address; generating a second address response packet based on the first IP address, the first MAC address, the first VTEP identifier, the fourth IP address, the fourth MAC address, and the fourth VTEP identifier, where in the second address response packet, a source VTEP identifier is the first VTEP identifier, a source IP address is the first IP address, a source MAC address is the first MAC address, a destination IP address is the fourth IP address, a destination MAC address is the fourth MAC address, and a destination VTEP identifier is the fourth VTEP identifier; and sending the second address response packet by using the transceiver 730, so that the first layer 2 gateway device establishes the third forwarding entry according to the received second address response packet, and the first host establishes the second forwarding entry according to the received second address response packet that is obtained after VXLAN decapsulation and that is sent by the first layer 2 gateway device.

Optionally, the processor 710 may invoke the program instruction stored in the memory 720 to further perform the following processing: receiving, by using the transceiver 730, a third address request packet that is from the first host and that passes the first layer 2 gateway device, where in the third address request packet, a source IP address is the fourth IP address, a source MAC address is the fourth MAC address, a source VTEP identifier is the fourth VTEP identifier, a destination IP address is the first IP address, and a destination VTEP identifier is the second VTEP identifier; determining that, in the third address request packet, the destination IP address is the first IP address, and the destination VTEP identifier is the second VTEP identifier; determining the first VTEP identifier corresponding to the first IP address; and discarding the third address request packet.

Optionally, the processor 710 may invoke the program instruction stored in the memory 720 to further perform the following processing: sending a notification packet by using the transceiver 730, where in the notification packet, a source IP address is the first IP address, a source MAC address is the first MAC address, and a source VTEP identifier is the first VTEP identifier, so that after receiving the notification packet, the first layer 2 gateway device establishes the third forwarding entry, the first layer 2 gateway device performs VXLAN decapsulation on the notification packet, and sends, to the first host, the notification packet that is obtained after VXLAN decapsulation, and the first host establishes the second forwarding entry.

Optionally, the processor 710 may invoke the program instruction stored in the memory 720 to further perform the following processing: when it is determined that the first MAC address and/or the first IP address change/changes, sending the notification packet by using the transceiver 730.

Optionally, as shown in FIG. 7, the apparatus 700 may further include a bus system 740. The processor 710, the memory 720, and the transceiver 730 are connected to each other by using the bus system 740.

In this embodiment of the disclosure, the processor 710 may be a central processing unit (central processing unit, CPU), a network processor (network processor, NP), or a combination of a CPU and an NP. The processor 710 may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), a generic array logic (generic array logic, GAL), or any combination thereof.

In addition to a data bus, the bus system 740 may further include a power bus, a control bus, a status signal bus, and the like. For ease of denotation, the bus system 740 is indicated by using only one bold line in the figure. However, it does not mean that there is only one bus or only one type of bus.

Optionally, the apparatus 700 shown in FIG. 7 may include the first layer 3 gateway device in the foregoing method embodiments and may implement corresponding functions of the first layer 3 gateway device. For brevity, details are not described herein again.

An embodiment of the disclosure further relates to a data center of a VXLAN. The data center includes a first layer 3 gateway device, a second layer 3 gateway device, and a first layer 2 gateway device separately connected to the first layer 3 gateway device and the second layer 3 gateway device. The first layer 2 gateway device is connected to a first host. The first layer 3 gateway device has a first Internet Protocol IP address, a second IP address, a first Media Access Control MAC address, a second MAC address, a first VXLAN tunnel end point VTEP identifier corresponding to the first IP address and the first MAC address, and a second VTEP identifier corresponding to the second IP address and the second MAC address. The second layer 3 gateway device has the first IP address, a third IP address, the first MAC address, a third MAC address, the first VTEP identifier, and a third VTEP identifier corresponding to the third IP address and the third MAC address. The first layer 2 gateway device has a fourth VTEP identifier. The first host has a fourth IP address and a fourth MAC address. The first IP address, the second IP address, the third IP address, and the fourth IP address are different from each other. The first MAC address, the second MAC address, the third MAC address, and the fourth MAC address are different from each other. The first VTEP identifier, the second VTEP identifier, the third VTEP identifier, and the fourth VTEP identifier are different from each other.

Optionally, the data center further includes a load balancing device. The load balancing device is configured to forward, to the first layer 3 gateway device or the second layer 3 gateway device, a packet that is from the first host and in which a destination IP address is the first IP address, a destination MAC address is the first MAC address, and a destination VTEP identifier is the first VTEP identifier, to implement load balancing.

Optionally, the first layer 3 gateway device may include the foregoing apparatus 600 or 700.

In this embodiment of the disclosure, a plurality of layer 3 gateway devices have a shared IP address (a virtual IP address), a shared MAC address (a virtual MAC address), and a shared VTEP identifier (a virtual VTEP identifier). Each gateway device has an exclusive IP address (a real IP address), an exclusive MAC address (a real MAC address), and an exclusive VTEP identifier (a real VTEP identifier). The layer 3 gateway device may assist, by using the shared IP address (the virtual IP address), the shared MAC address (the virtual MAC address), and the shared VTEP identifier (the virtual VTEP identifier), a host and a layer 2 gateway device in establishing a forwarding entry. Therefore, the host and the layer 2 gateway device can send traffic by using the forwarding entry. Because a destination address in the traffic is corresponding to the plurality of layer 3 gateway devices, the traffic can be forwarded to any one of the plurality of layer 3 gateway devices, to implement balancing and an active-active function. In addition, the layer 3 gateway device broadcasts an address request packet to the host based on the exclusive IP address (the real IP address), the exclusive MAC address (the real MAC address), and the exclusive VTEP identifier (the real VTEP identifier) of the layer 3 gateway device. If an ARP response packet that is fed back by the host and that passes the layer 2 gateway device carries the exclusive IP address, the exclusive MAC address, and the exclusive VTEP identifier of the layer 3 gateway device, the address response packet is not sent to another layer 3 gateway device. Therefore, a forwarding entry can be correctly established, and traffic can be sent from the gateway device to the host device.

Figure 8:
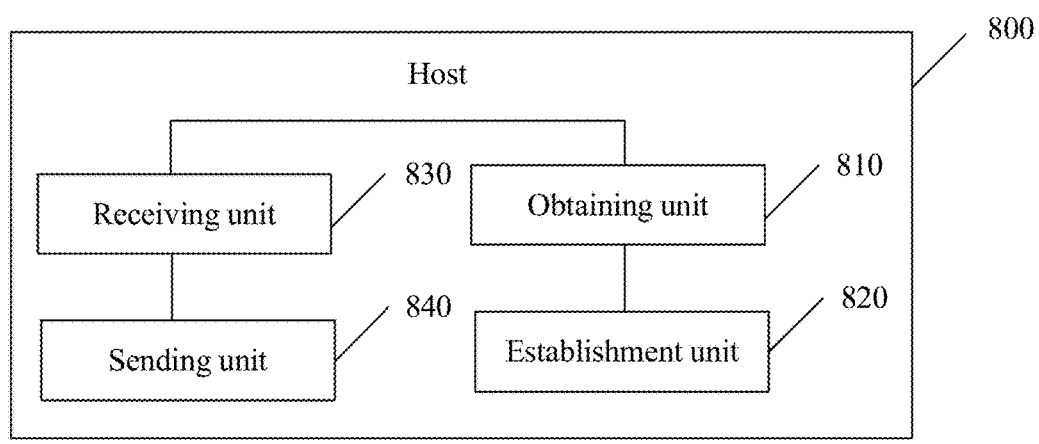
FIG. 8 is a schematic block diagram of a host according to an embodiment of the disclosure.

FIG. 8 is a schematic block diagram of a host 800 of a VXLAN according to an embodiment of the disclosure. The host is a first host. A data center of the VXLAN includes a first layer 3 gateway device, a second layer 3 gateway device, and a first layer 2 gateway device separately connected to the first layer 3 gateway device and the second layer 3 gateway device. The first layer 2 gateway device is connected to the first host. The first layer 3 gateway device has a first IP address, a second IP address, a first MAC address corresponding to the first IP address, a second MAC address corresponding to the second IP address, a first VXLAN tunnel end point VTEP identifier corresponding to the first IP address and the first MAC address, and a second VTEP identifier corresponding to the second IP address and the second MAC address. The second layer 3 gateway device has the first IP address, a third IP address, the first MAC address, a third MAC address corresponding to the third IP address, the first VTEP identifier, and a third VTEP identifier corresponding to the third IP address and the third MAC address. The first layer 2 gateway device has a fourth VTEP identifier. The first host has a fourth IP address and a fourth MAC address corresponding to the fourth IP address. The first IP address, the second IP address, the third IP address, and the fourth IP address are different from each other. The first MAC address, the second MAC address, the third MAC address, and the fourth MAC address are different from each other. The first VTEP identifier, the second VTEP identifier, the third VTEP identifier, and the fourth VTEP identifier are different from each other.

The host 800 includes an obtaining unit 810 and an establishment unit 820. The obtaining unit 810 is configured to obtain the first MAC address corresponding to the first IP address. The establishment unit 820 is configured to establish a second forwarding entry based on the first IP address, the first MAC address, the fourth IP address, and the fourth MAC address. In the second forwarding entry, a source IP address is the fourth IP address, a source MAC address is the fourth MAC address, a destination IP address is the first IP address, and a destination MAC address is the first MAC address.

Optionally, the obtaining unit 810 is specifically configured to obtain, by using the first IP address, the fourth IP address, and the fourth MAC address, the first MAC address corresponding to the first IP address.

Optionally, as shown in FIG. 8, the host 800 further includes a receiving unit 830 and a sending unit 840.

Optionally, the sending unit 840 is configured to send a second address request packet to the first layer 2 gateway device. In the second address request packet, a source IP address is the fourth IP address, a source MAC address is the fourth MAC address, and a destination IP address is the first IP address. The receiving unit 830 is configured to receive a second address response packet. In the second address response packet, a source IP address is the first IP address, a source MAC address is the first MAC address, a destination IP address is the fourth IP address, and a destination MAC address is the fourth MAC address. The obtaining unit 810 is configured to obtain, from the second address response packet, the first MAC address corresponding to the first IP address.

Optionally, the receiving unit 830 is configured to receive a notification packet. In the notification packet, a source IP address is the first IP address, and a source MAC address is the first MAC address. The obtaining unit 810 is configured to obtain, from the notification packet, the first MAC address corresponding to the first IP address.

Optionally, functions and specific embodiments of the obtaining unit 810, the establishment unit 820, the receiving unit 830, and the sending unit 840 may be implemented by a processor, an application-specific integrated circuit ASIC, or the like.

Optionally, the host 800 may be corresponding to the host or the first host in the foregoing embodiments, and may implement corresponding functions of the host or the first host. For brevity, details are not described herein again.

An embodiment of the disclosure further relates to a host. The host includes a memory and a processor. The memory is configured to store an instruction. The processor is configured to execute the instruction stored in the memory. When the processor executes the instruction stored in the memory, the execution enables the processor to perform all the functions or operations of the host 800. For components and a connection relationship of the host, refer to FIG. 7.

Figure 9:
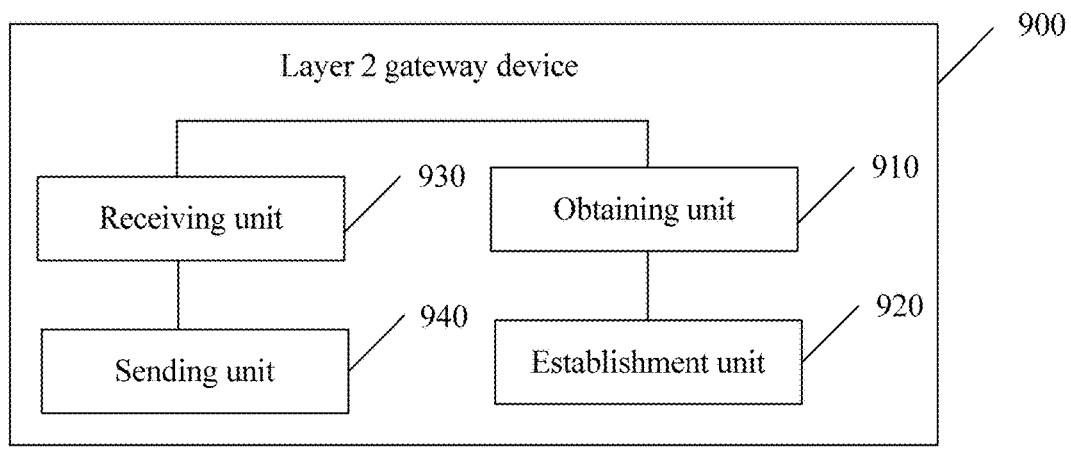
FIG. 9 is a schematic block diagram of a layer 2 gateway device according to an embodiment of the disclosure.

FIG. 9 is a schematic block diagram of a layer 2 gateway device 900 of a VXLAN according to an embodiment of the disclosure. The layer 2 gateway device 900 is a first layer 2 gateway device. A data center of the VXLAN includes a first layer 3 gateway device, a second layer 3 gateway device, and the first layer 2 gateway device separately connected to the first layer 3 gateway device and the second layer 3 gateway device. The first layer 2 gateway device is connected to a first host. The first layer 3 gateway device has a first IP address, a second IP address, a first MAC address corresponding to the first IP address, a second MAC address corresponding to the second IP address, a first VXLAN tunnel end point VTEP identifier corresponding to the first IP address and the first MAC address, and a second VTEP identifier corresponding to the second IP address and the second MAC address. The second layer 3 gateway device has the first IP address, a third IP address, the first MAC address, a third MAC address corresponding to the third IP address, the first VTEP identifier, and a third VTEP identifier corresponding to the third IP address and the third MAC address. The first layer 2 gateway device has a fourth VTEP identifier. The first host has a fourth IP address and a fourth MAC address corresponding to the fourth IP address. The first IP address, the second IP address, the third IP address, and the fourth IP address are different from each other. The first MAC address, the second MAC address, the third MAC address, and the fourth MAC address are different from each other. The first VTEP identifier, the second VTEP identifier, the third VTEP identifier, and the fourth VTEP identifier are different from each other.

The device 900 includes an obtaining unit 910 and an establishment unit 920. The obtaining unit 910 is configured to obtain the first VTEP identifier corresponding to the first MAC address. The establishment unit 920 is configured to establish a third forwarding entry based on the first MAC address and the first VTEP identifier. The third forwarding entry is used to indicate that the first MAC address is corresponding to the first VTEP identifier.

Optionally, as shown in FIG. 9, the layer 2 gateway device 900 further includes a receiving unit 930 and a sending unit 940.

Optionally, the receiving unit 930 is configured to receive a second address request packet sent by the first host. In the second address request packet, a source IP address is the fourth IP address, a source MAC address is the fourth MAC address, and a destination IP address is the first IP address. The sending unit 940 is configured to: perform VXLAN encapsulation on the second address request packet, and broadcast the second address request packet that is obtained after VXLAN encapsulation. The receiving unit 930 is configured to receive a second address response packet. In the second address response packet, a source IP address is the first IP address, a source MAC address is the first MAC address, a source VTEP identifier is the first VTEP identifier, a destination IP address is the fourth IP address, a destination MAC address is the fourth MAC address, and a destination VTEP identifier is the fourth VTEP identifier. The obtaining unit 910 is configured to obtain, from the second address response packet, the first VTEP identifier corresponding to the first MAC address.

Optionally, the sending unit 940 is specifically configured to: perform VXLAN encapsulation on the second address request packet, to generate a plurality of second address request packets, where the plurality of second address request packets carry different destination VTEP identifiers, and the plurality of second address request packets include a packet in which a destination VTEP identifier is the first VTEP identifier, a packet in which a destination VTEP identifier is the second VTEP identifier, and a packet in which a destination VTEP identifier is the third VTEP identifier; or encapsulate a second multicast VTEP identifier into the second address request packet.

Optionally, the receiving unit 930 is configured to receive a notification packet. In the notification packet, a source IP address is the first IP address, a source MAC address is the first MAC address, and a source VTEP identifier is the first VTEP identifier. The obtaining unit 910 is configured to determine, from the notification packet, the first VTEP identifier corresponding to the first MAC address.

Optionally, functions and specific embodiments of the obtaining unit 910, the establishment unit 920, the receiving unit 930, and the sending unit 940 may be implemented by a processor, an application-specific integrated circuit ASIC, or the like.

Optionally, the device 900 may be corresponding to the first layer 2 gateway device in the method embodiments, and may implement corresponding functions of the layer 2 gateway device. For brevity, details are not described herein again.

An embodiment of the disclosure further relates to a layer 2 gateway device, including a memory and a processor. The memory is configured to store an instruction. The processor is configured to execute the instruction stored in the memory. When the processor executes the instruction stored in the memory, the execution enables the processor to perform all the functions and operations of the layer 2 gateway device. For components and a connection relationship of the layer 2 gateway device, refer to FIG. 7.

Figure 10:
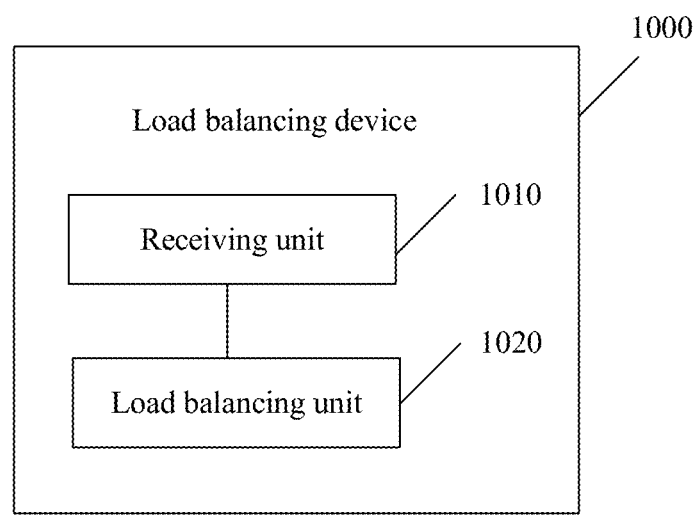
FIG. 10 is a schematic block diagram of a load balancing device according to an embodiment of the disclosure.

FIG. 10 is a schematic block diagram of a load balancing device 1000 of a VXLAN according to an embodiment of the disclosure. A data center of the VXLAN includes a first layer 3 gateway device, a second layer 3 gateway device, a first layer 2 gateway device separately connected to the first layer 3 gateway device and the second layer 3 gateway device, and the load balancing device separately connected to the first layer 3 gateway device and the second layer 3 gateway device. The first layer 2 gateway device is connected to a first host. The first layer 3 gateway device has a first IP address, a second IP address, a first MAC address corresponding to the first IP address, a second MAC address corresponding to the second IP address, a first VXLAN tunnel end point VTEP identifier corresponding to the first IP address and the first MAC address, and a second VTEP identifier corresponding to the second IP address and the second MAC address. The second layer 3 gateway device has the first IP address, a third IP address, the first MAC address, a third MAC address corresponding to the third IP address, the first VTEP identifier, and a third VTEP identifier corresponding to the third IP address and the third MAC address. The first layer 2 gateway device has a fourth VTEP identifier. The first host has a fourth IP address and a fourth MAC address corresponding to the fourth IP address. The first IP address, the second IP address, the third IP address, and the fourth IP address are different from each other. The first MAC address, the second MAC address, the third MAC address, and the fourth MAC address are different from each other. The first VTEP identifier, the second VTEP identifier, the third VTEP identifier, and the fourth VTEP identifier are different from each other. The device 1000 includes a receiving unit 1010 and a load balancing unit 1020.

The receiving unit 1010 is configured to receive a traffic packet. In the traffic packet, a source IP address is the fourth IP address, a source MAC address is the fourth MAC address, a source VTEP identifier is the fourth VTEP identifier, a destination IP address is the first IP address, a destination MAC address is the first MAC address, and a destination VTEP identifier is the first VTEP identifier. The load balancing unit 1020 is configured to forward the traffic packet to the first layer 3 gateway device or the second layer 3 gateway device, to implement load balancing.

Optionally, the load balancing device and the first layer 2 gateway device in all the foregoing embodiments are integrated into a same device. In this case, the device into which the two devices are integrated has both functions and operations of the layer 2 gateway device described in all the foregoing embodiments and functions and operations of the load balancing device described herein.

Optionally, the load balancing device and the first layer 2 gateway device are disposed in different devices.

An embodiment of the disclosure further relates to a load balancing device, including a memory and a processor. The memory is configured to store an instruction. The processor is configured to execute the instruction stored in the memory. When the processor executes the instruction stored in the memory, the execution enables the processor to perform all the functions and operations of the load balancing device. For components and a connection relationship of the load balancing device, refer to FIG. 7.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the embodiment goes beyond the scope of the disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments described in the disclosure, it should be understood that the disclosed system, apparatus, and method may be implemented in other manners. For example, the described apparatus embodiment is only an example. For example, the unit division is only logical function division and may be other division in actual embodiment. For example, a plurality of units or components may be combined or integrated into another system, or some features may be ignored or not performed. In addition, the shown or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separated, and parts shown as units may or may not be physical units, may be located in one position, or may be distributed on a plurality of network units. Some or all of the units may be selected according to actual requirements to achieve the objectives of the solutions of the embodiments.

In addition, functional units in the embodiments of the disclosure may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of the disclosure essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the disclosure. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are only specific embodiments of the disclosure, but are not intended to limit the protection scope of the disclosure. Any variation or replacement readily figured out by a person skilled in the art within the technical scope disclosed in the disclosure shall fall within the protection scope of the disclosure. Therefore, the protection scope of the disclosure shall be subject to the protection scope of the claims.

What is claimed is:

1. A forwarding entry establishment method for a Virtual Extensible Local Area Network (VXLAN), wherein a data center of the VXLAN comprises a first layer 3 gateway device, a second layer 3 gateway device, and a first layer 2 gateway device separately connected to the first layer 3 gateway device and the second layer 3 gateway device; the first layer 2 gateway device is connected to a first host; the first layer 3 gateway device has a first Internet Protocol (IP) address, a second IP address, a first Media Access Control (MAC) address corresponding to the first IP address, a second MAC address corresponding to the second IP address, a first VXLAN tunnel end point (VTEP) identifier corresponding to the first IP address and the first MAC address, and a second VTEP identifier corresponding to the second IP address and the second MAC address; the second layer 3 gateway device has the first IP address, a third IP address, the first MAC address, a third MAC address corresponding to the third IP address, the first VTEP identifier, and a third VTEP identifier corresponding to the third IP address and the third MAC address; the first layer 2 gateway device has a fourth VTEP identifier; the first host has a fourth IP address and a fourth MAC address corresponding to the fourth IP address; the first IP address, the second IP address, the third IP address, and the fourth IP address are different from each other; the first MAC address, the second MAC address, the third MAC address, and the fourth MAC address are different from each other; the first VTEP identifier, the second VTEP identifier, the third VTEP identifier, and the fourth VTEP identifier are different from each other; and the method comprises:

obtaining, by the first layer 3 gateway device, the fourth MAC address of the first host and the fourth VTEP identifier of the first layer 2 gateway device by using the second IP address, the second MAC address, the second VTEP identifier, and the fourth IP address, wherein the second IP address is an IP address exclusive to the first layer 3 gateway device, the second MAC address is a MAC address exclusive to the first layer 3 gateway device, and the second VTEP identifier is a VTEP identifier exclusive to the first layer 3 gateway device; and establishing a first forwarding entry based on the second IP address, the second MAC address, the second VTEP identifier, the fourth IP address, the fourth MAC address, and the fourth VTEP identifier, wherein in the first forwarding entry, a source IP address is the second IP address, a source MAC address is the second MAC address, a destination IP address is the fourth IP address, and a destination MAC address is the fourth MAC address, and the first forwarding entry is used to indicate that the fourth MAC address is corresponding to the fourth VTEP identifier.

2. The method of claim 1, wherein the obtaining, by the first layer 3 gateway device, the fourth MAC address of the first host and the fourth VTEP identifier of the first layer 2 gateway device by using the second IP address, the second MAC address, the second VTEP identifier, and the fourth IP address comprises:

sending, by the first layer 3 gateway device, a first address request packet, wherein in the first address request packet, a source IP address is the second IP address, a source MAC address is the second MAC address, a source VTEP identifier is the second VTEP identifier, and a destination IP address is the fourth IP address;

receiving, by the first layer 3 gateway device, a first address response packet that is from the first host and that passes the first layer 2 gateway device, wherein in the first address response packet, a destination IP address is the second IP address, a destination MAC address is the second MAC address, a destination VTEP identifier is the second VTEP identifier, a source IP address is the fourth IP address, a source MAC address is the fourth MAC address, and a source VTEP identifier is the fourth VTEP identifier; and obtaining the fourth MAC address of the first host and the fourth VTEP identifier of the first layer 2 gateway device based on the first address response packet.

3. The method of claim 2, wherein the data center comprises a plurality of layer 2 gateway devices, each of the plurality of layer 2 gateway devices is connected to the first layer 3 gateway device, and the plurality of layer 2 gateway devices comprise the first layer 2 gateway device; and sending, by the first layer 3 gateway device, a first address request packet comprises:

sending, by the first layer 3 gateway device, a plurality of first address request packets, wherein the plurality of first address request packets are in a one-to-one correspondence with the plurality of layer 2 gateway devices, and each first address request packet carries a VTEP identifier of a corresponding layer 2 gateway device; or sending, by the first layer 3 gateway device, the first address request packet, wherein a VTEP identifier in the first address request packet is a first multicast VTEP identifier.

4. The method of claim 2, wherein a server to which the first host belongs is a silent server.

5. The method of claim 1, wherein the method further comprises:

by using the first IP address, the first MAC address, and the first VTEP identifier, assisting, by the first layer 3 gateway device, the first host in establishing a second forwarding entry, and assisting the first layer 2 gateway device in establishing a third forwarding entry, wherein in the second forwarding entry, a source IP address is the fourth IP address, a source MAC address is the fourth MAC address, a destination IP address is the first IP address, and a destination MAC address is the first MAC address, and the third forwarding entry is used to indicate that the first MAC address is corresponding to the first VTEP identifier.

6. The method of claim 5, wherein before the assisting the first host in establishing a second forwarding entry, and assisting the first layer 2 gateway device in establishing a third forwarding entry, the method further comprises:

receiving, by the first layer 3 gateway device, a second address request packet that is from the first host and that passes the first layer 2 gateway device, wherein in the second address request packet, a source IP address is the fourth IP address, a source MAC address is the fourth MAC address, a source VTEP identifier is the fourth VTEP identifier, a destination IP address is the first IP address, and a destination VTEP identifier is the first VTEP identifier or a second multicast VTEP identifier; and assisting the first host in establishing a second forwarding entry, and assisting the first layer 2 gateway device in establishing a third forwarding entry comprises:

determining that the destination IP address in the second address request packet is the first IP address;

determining the first MAC address corresponding to the first IP address, and the first VTEP identifier corresponding to the first IP address;

generating a second address response packet based on the first IP address, the first MAC address, the first VTEP identifier, the fourth IP address, the fourth MAC address, and the fourth VTEP identifier, wherein in the second address response packet, a source VTEP identifier is the first VTEP identifier, a source IP address is the first IP address, a source MAC address is the first MAC address, a destination IP address is the fourth IP address, a destination MAC address is the fourth MAC address, and a destination VTEP identifier is the fourth VTEP identifier; and sending, by the first layer 3 gateway device, the second address response packet, so that the first layer 2 gateway device establishes the third forwarding entry according to the received second address response packet, and the first host establishes the second forwarding entry according to the received second address response packet that is obtained after VXLAN decapsulation and that is sent by the first layer 2 gateway device.

7. The method of claim 6, wherein the method further comprises:

receiving, by the first layer 3 gateway device, a third address request packet that is from the first host and that passes the first layer 2 gateway device, wherein in the third address request packet, a source IP address is the fourth IP address, a source MAC address is the fourth MAC address, a source VTEP identifier is the fourth VTEP identifier, a destination IP address is the first IP address, and a destination VTEP identifier is the second VTEP identifier;

determining that, in the third address request packet, the destination IP address is the first IP address, and the destination VTEP identifier is the second VTEP identifier;

determining the first VTEP identifier corresponding to the first IP address; and discarding the third address request packet.

8. The method of claim 5, wherein the assisting the first host in establishing a second forwarding entry, and assisting the first layer 2 gateway device in establishing a third forwarding entry comprises:

sending, by the first layer 3 gateway device, a notification packet, wherein in the notification packet, a source IP address is the first IP address, a source MAC address is the first MAC address, and a source VTEP identifier is the first VTEP identifier, so that the first layer 2 gateway device establishes the third forwarding entry according to the received notification packet, the first layer 2 gateway device performs VXLAN decapsulation on the notification packet, and sends, to the first host, the notification packet that is obtained after VXLAN decapsulation, and the first host establishes the second forwarding entry according to the received notification packet that is obtained after VXLAN decapsulation and that is sent by the first layer 2 gateway device.

9. The method of claim 8, wherein before the sending, by the first layer 3 gateway device, a notification packet, the method further comprises:
determining that the first MAC address and/or the first IP address change/changes.

10. A forwarding entry establishment apparatus for a Virtual Extensible Local Area Network (VXLAN), comprising:
a non-transitory memory storing instructions; and
a processor coupled to the non-transitory memory;
wherein a data center of the VXLAN comprises a first layer 3 gateway device, a second layer 3 gateway device, and a first layer 2 gateway device separately connected to the first layer 3 gateway device and the second layer 3 gateway device; the first layer 2 gateway device is connected to a first host; the first layer 3 gateway device has a first Internet Protocol (IP) address, a second IP address, a first Media Access Control (MAC) address corresponding to the first IP address, a second MAC address corresponding to the second IP address, a first VXLAN tunnel end point (VTEP) identifier corresponding to the first IP address and the first MAC address, and a second VTEP identifier corresponding to the second IP address and the second MAC address; the second layer 3 gateway device has the first IP address, a third IP address, the first MAC address, a third MAC address corresponding to the third IP address, the first VTEP identifier, and a third VTEP identifier corresponding to the third IP address and the third MAC address; the first layer 2 gateway device has a fourth VTEP identifier; the first host has a fourth IP address and a fourth MAC address corresponding to the fourth IP address; the first IP address, the second IP address, the third IP address, and the fourth IP address are different from each other; the first MAC address, the second MAC address, the third MAC address, and the fourth MAC address are different from each other; and the first VTEP identifier, the second VTEP identifier, the third VTEP identifier, and the fourth VTEP identifier are different from each other; and the forwarding entry establishment apparatus is the first layer 3 gateway device;
wherein the instructions, when executed by the processor, cause the apparatus to be configured to:
obtain the fourth MAC address of the first host and the fourth VTEP identifier of the first layer 2 gateway device by using the second IP address, the second MAC address, the second VTEP identifier, and the fourth IP address, wherein the second IP address is an IP address exclusive to the first layer 3 gateway device, the second MAC address is a MAC address exclusive to the first layer 3 gateway device, and the second VTEP identifier is a VTEP identifier exclusive to the first layer 3 gateway device; and
establish a first forwarding entry based on the second IP address, the second MAC address, the second VTEP identifier, the fourth IP address, the fourth MAC address, and the fourth VTEP identifier, wherein in the first forwarding entry, a source IP address is the second IP address, a source MAC address is the second MAC address, a destination IP address is the fourth IP address, and a destination MAC address is the fourth MAC address, and the first forwarding entry is used to indicate that the fourth MAC address is corresponding to the fourth VTEP identifier.

11. The apparatus of claim 10, wherein the instructions, when executed by the processor, further cause the apparatus to be configured to:
send a first address request packet, wherein in the first address request packet, a source IP address is the second IP address, a source MAC address is the second MAC address, a source VTEP identifier is the second VTEP identifier, and a destination IP address is the fourth IP address; and
receive a first address response packet that is from the first host and that passes the first layer 2 gateway device, wherein in the first address response packet, a destination IP address is the second IP address, a destination MAC address is the second MAC address, a destination VTEP identifier is the second VTEP identifier, a source IP address is the fourth IP address, a source MAC address is the fourth MAC address, and a source VTEP identifier is the fourth VTEP identifier, wherein
obtain the fourth MAC address of the first host and the fourth VTEP identifier of the first layer 2 gateway device based on the first address response packet.

12. The apparatus of claim 11, wherein the data center comprises a plurality of layer 2 gateway devices, each of the plurality of layer 2 gateway devices is connected to the first layer 3 gateway device, and the plurality of layer 2 gateway devices comprise the first layer 2 gateway device; and
wherein the instructions, when executed by the processor, further cause the apparatus to be configured to:
send a plurality of first address request packets, wherein the plurality of first address request packets are in a one-to-one correspondence with the plurality of layer 2 gateway devices, and each first address request packet carries a VTEP identifier of a corresponding layer 2 gateway device; or
send the first address request packet, wherein a VTEP identifier in the first address request packet is a first multicast VTEP identifier.

13. The apparatus of claim 11, wherein a server to which the first host belongs is a silent server.

14. The apparatus of claim 10, wherein the instructions, when executed by the processor, further cause the apparatus to be configured to:
by using the first IP address, the first MAC address, and the first VTEP identifier, assist the first host in establishing a second forwarding entry, and assist the first layer 2 gateway device in establishing a third forwarding entry, wherein in the second forwarding entry, a source IP address is the fourth IP address, a source MAC address is the fourth MAC address, a destination IP address is the first IP address, and a destination MAC address is the first MAC address, and the third forwarding entry is used to indicate that the first MAC address is corresponding to the first VTEP identifier.

15. The apparatus of claim 14, wherein the instructions, when executed by the processor, further cause the apparatus to be configured to:
receive a second address request packet that is from the first host and that passes the first layer 2 gateway device, wherein in the second address request packet, a source IP address is the fourth IP address, a source MAC address is the fourth MAC address, a source VTEP identifier is the fourth VTEP identifier, a destination IP address is the first IP address, and a destination VTEP identifier is the first VTEP identifier or a second multicast VTEP identifier;
determine that the destination IP address in the second address request packet is the first IP address;

determine the first MAC address corresponding to the first IP address, and the first VTEP identifier corresponding to the first IP address;

generate a second address response packet based on the first IP address, the first MAC address, the first VTEP identifier, the fourth IP address, the fourth MAC address, and the fourth VTEP identifier, wherein in the second address response packet, a source VTEP identifier is the first VTEP identifier, a source IP address is the first IP address, a source MAC address is the first MAC address, a destination IP address is the fourth IP address, a destination MAC address is the fourth MAC address, and a destination VTEP identifier is the fourth VTEP identifier; and send the second address response packet, so that the first layer 2 gateway device establishes the third forwarding entry according to the received second address response packet, and the first host establishes the second forwarding entry according to the received second address response packet that is obtained after VXLAN decapsulation and that is sent by the first layer 2 gateway device.

16. The apparatus of claim 15, wherein the instructions, when executed by the processor, further cause the apparatus to be configured to:

receive a third address request packet that is from the first host and that passes the first layer 2 gateway device, wherein in the third address request packet, a source IP address is the fourth IP address, a source MAC address is the fourth MAC address, a source VTEP identifier is the fourth VTEP identifier, a destination IP address is the first IP address, and a destination VTEP identifier is the second VTEP identifier;

determine that, in the third address request packet, the destination IP address is the first IP address, and the destination VTEP identifier is the second VTEP identifier;

determine the first VTEP identifier corresponding to the first IP address; and discard the third address request packet.

17. The apparatus of claim 14, wherein the instructions, when executed by the processor, further cause the apparatus to be configured to:

generate a notification packet, wherein in the notification packet, a source IP address is the first IP address, a source MAC address is the first MAC address, and a source VTEP identifier is the first VTEP identifier;

send the notification packet, so that the first layer 2 gateway device establishes the third forwarding entry according to the received notification packet, the first layer 2 gateway device performs VXLAN decapsulation on the notification packet, and sends, to the first host, the notification packet that is obtained after VXLAN decapsulation, and the first host establishes the second forwarding entry according to the received notification packet that is obtained after VXLAN decapsulation and that is sent by the first layer 2 gateway device.

18. The apparatus of claim 17, wherein the instructions, when executed by the processor, further cause the apparatus to be configured to:

generate the notification packet when it is determined that the first MAC address and/or the first IP address change/changes.

19. A data center system of a Virtual Extensible Local Area Network (VXLAN), wherein the data center system comprises a first layer 3 gateway device, a second layer 3 gateway device, and a first layer 2 gateway device separately connected to the first layer 3 gateway device and the second layer 3 gateway device; the first layer 2 gateway device is connected to a first host; the first layer 3 gateway device has a first Internet Protocol (IP) address, a second IP address, a first Media Access Control (MAC) address, a second MAC address, a first VXLAN tunnel end point (VTEP) identifier corresponding to the first IP address and the first MAC address, and a second VTEP identifier corresponding to the second IP address and the second MAC address; the second layer 3 gateway device has the first IP address, a third IP address, the first MAC address, a third MAC address, the first VTEP identifier, and a third VTEP identifier corresponding to the third IP address and the third MAC address; the first layer 2 gateway device has a fourth VTEP identifier; the first host has a fourth IP address and a fourth MAC address; the first IP address, the second IP address, the third IP address, and the fourth IP address are different from each other; the first MAC address, the second MAC address, the third MAC address, and the fourth MAC address are different from each other; and the first VTEP identifier, the second VTEP identifier, the third VTEP identifier, and the fourth VTEP identifier are different from each other.

20. The data center system of claim 19, wherein the first layer 3 gateway device is the forwarding entry establishment apparatus according to claim 10.

21. The data center system of claim 19, wherein the data center system further comprises a load balancing device, and the load balancing device is configured to forward, to the first layer 3 gateway device or the second layer 3 gateway device, a packet that is from the first host and in which a destination IP address is the first IP address, a destination MAC address is the first MAC address, and a destination VTEP identifier is the first VTEP identifier, to implement load balancing.

* * * * *